United States Patent
Minoura et al.

(10) Patent No.: US 8,911,655 B2
(45) Date of Patent: Dec. 16, 2014

(54) PRODUCTION METHOD AND PRODUCTION DEVICE OF FILM HAVING FINE IRREGULAR PATTERN ON SURFACE

(75) Inventors: Kiyoshi Minoura, Otsu (JP); Yuma Hirai, Otsu (JP); Fumiyasu Nomura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 601 days.

(21) Appl. No.: 12/922,324

(22) PCT Filed: Mar. 6, 2009

(86) PCT No.: PCT/JP2009/054270
§ 371 (c)(1),
(2), (4) Date: Sep. 13, 2010

(87) PCT Pub. No.: WO2009/113453
PCT Pub. Date: Sep. 17, 2009

(65) Prior Publication Data
US 2011/0001264 A1 Jan. 6, 2011

(30) Foreign Application Priority Data
Mar. 14, 2008 (JP) .................. 2008-066058

(51) Int. Cl.
| B28B 11/08 | (2006.01) |
| B29C 31/08 | (2006.01) |
| B29C 31/00 | (2006.01) |
| B29C 43/34 | (2006.01) |
| B29C 59/02 | (2006.01) |
| B29C 43/02 | (2006.01) |
| B29K 105/00 | (2006.01) |
| B29C 43/36 | (2006.01) |

(52) U.S. Cl.
CPC .............. B29C 59/02 (2013.01); B29C 31/08 (2013.01); B29C 31/004 (2013.01); B29C 2043/023 (2013.01); B29C 43/34 (2013.01); B29C 43/021 (2013.01); B29C 2043/3422 (2013.01); B29K 2105/256 (2013.01); B29C 2043/3602 (2013.01)
USPC ............ 264/293; 264/291; 264/292; 264/294

(58) Field of Classification Search
USPC ........ 264/293, 280, 284, 299, 310, 1.34, 503, 264/509, 544, 555, 650, 241, 119
See application file for complete search history.

(56) References Cited

U.S. PATENT DOCUMENTS 4,027,517 A * 6/1977 Bodnar ........................... 72/177
2003/0012978 A1* 1/2003 Sodani et al. ................. 428/659

FOREIGN PATENT DOCUMENTS

| JP | 2002-104726 A | 4/2002 |
| JP | 2005-199455 A | 7/2005 |
| JP | 2005-310286 A | 11/2005 |
| JP | 2006-032400 A | 2/2006 |
| WO | WO 2008/047540 A1 | 4/2008 |

OTHER PUBLICATIONS

International Search Report dated Apr. 7, 2009, application No. PCT/JP2009/054270.

* cited by examiner

Primary Examiner — Jeffrey Wollschlager
Assistant Examiner — Stella Yi
(74) Attorney, Agent, or Firm — RatnerPrestia

(57) ABSTRACT

A method for producing a film having a fine irregular pattern intermittently includes feeding a film to be processed intermittently from upstream side to the vicinity of the surface of a die having a fine irregular pattern, transferring the pattern to the surface of the film by pressing the film against the surface of a die, stripping the processed film on which a pattern is formed from the surface of a die, and then feeding a new film to be processed to the die, wherein the processed film is stripped from the surface of a die by gripping and moving the processed film to the upstream side, and then the processed film is fed by a length of intermittent feed to the surface of a die while preventing the processed film from creasing.

4 Claims, 7 Drawing Sheets

(a)

(b)

(c)

(d)

(e)

(f)

(g)

(a)

(b)

(c)

(d)

(e)

(f)

(g)

(h)

PRODUCTION METHOD AND PRODUCTION DEVICE OF FILM HAVING FINE IRREGULAR PATTERN ON SURFACE

CROSS-REFERENCE TO RELATED APPLICATIONS

This application is the U.S. National Phase application of PCT International Application No. PCT/JP09/054,270, filed Mar. 6, 2009, and claims priority of Japanese Patent Application No. 2008-066058, filed Mar. 14, 2008, the disclosures of both of which are incorporated herein by reference in their entirety for all purposes.

FIELD OF THE INVENTION

The present invention relates to a production method and a production apparatus for a film having a fine asperity pattern on a surface thereof. Such a film having a fine irregular pattern on its surface is used as material for producing optical mediums or optical products.

BACKGROUND OF THE INVENTION

In a known method to produce an optical film for use as optical medium in light guide plates, light diffusion plates, lenses, etc., a film is pressed against a surface having a fine asperity pattern of an original plate to transfer the fine asperity pattern of the original plate onto a surface of the film. A long resin film is used as the film, and a portion having a predetermined length of the long film which is as a processing film is supplied intermittently onto a surface having a fine asperity pattern of a transfer plate (mold), and the processing film is pressed against the surface of the transfer plate to transfer the pattern to the surface of the processing film. After completion of the transfer, the processing film formed the pattern referred as a processed film is pulled in the direction of the length of the surface of the transfer plate to provide peel off the processed film from the surface of the transfer plate. Then, as the processing film peeled is taken up, a new processing film having a predetermined length is supplied onto the surface of the transfer plate. Such processes to produce optical products are proposed in Patent Literatures 1 and 2.

This generally known method has a peeling step to peel off the processed film from the surface of the transfer plate and a supply step to supply the new processing film having a predetermined length onto the surface of the transfer plate. There is a case that the peeling step is called as a mold release step, since a film having a pattern is released from a surface formed a pattern, that is, a mold. This generally known method can suffer problems as described below.

In the peeling step, or the mold release step, therefore, depending on the characteristics of a film used or depletion of a mold releasing agent on a surface of a mold, the film can adhere to the mold surface to damage the mold surface, leaving flaws, or mold release marks, on a transfer surface of the film.

In the supply step, a thickness and characteristics of the film can have influence on a formation of crease on the film supplied onto the mold surface.

In addition, a film supplied onto a heated mold surface can soften in local portions at increased temperatures before being pressed against the surface of the transfer plate, and softened portions can be stretched under the tension applied to the film, leading to local undulation caused on the patterned surface. Such local undulation can be caused significantly in low-rigidity or thin films.

Patent Literature 1: JP 2005-199455 A
Patent Literature 2: JP 2005-310286 A

SUMMARY OF THE INVENTION

The invention was achieved in the process of study aiming to develop techniques for solving the aforementioned problems. As a processed film produced by forming a fine asperity pattern on a portion having a predetermined length of a long film is peeled off from a mold surface while a new processing film based on another portion having a predetermined length of the long film is supplied along the mold surface, the new processing film is supplied along the mold surface without creases in order to depress the formation of defective patterns. The invention also provides for simultaneously depressing the formation of undulation under local heat load on the film before the processing film is pressed against the mold surface.

Described below is a method according to one aspect of the invention to produce a film having a fine asperity pattern on its surface.

A production method for a film having a fine asperity pattern on its surface, comprising:

(1-a) a film supply step in which a processing film taken out from a long film strip supply source provided on the upstream side is supplied intermittently by a predetermined length onto a mold surface having a fine asperity pattern, (1-b) a pattern forming step in which the processing film supplied onto the mold surface in the film supply step is pressed against the mold surface so that the pattern on the mold surface is transferred to a surface of the processing film to form a fine asperity pattern on the surface of the processing film, (1-c) a film peeling step in which a processed film having the pattern formed on its surface in the pattern forming step is peeled off from the mold surface, and (1-d) a film delivery step in which the processed film peeled off from the mold surface in the film peeling step is delivered to a long film strip storage source provided on the downstream side, thus processing a film in the pattern forming step to produce the processed film, peeling it off from the mold surface in the film peeling step, and then delivering the processed film to the film storage source in the film delivery step while another predetermined length of the processing film to be processed next is supplied intermittently onto the mold surface, in order to perform repeated production of the processed film with a predetermined length at a time, wherein (1-e) the peeling of the processed film in the film peeling step is achieved by a film holding means that holds the processed film and moves from the downstream side toward the upstream side in the length direction of the processed film, and (1-f) the supply of the processing film in the film supply step is achieved as a crease formation prevention means to prevent creases from forming on the processing film supplied onto the mold surface moves from the upstream side toward the downstream side in the length direction of the processed film.

The film production method in an embodiment of the invention is preferably in any of the following three illustrative embodiments.

First illustrative embodiment of the film production method:

The film production method according to one aspect of the invention, wherein (2-a) the film holding means comprises a combination of a main roll that comes in contact with the opposite surface of the film to the surface on which the pattern is formed and an auxiliary roll that comes in contact with the surface of the film on which the pattern is formed, and in the combination, both the roll axis of the main roll and that of the auxiliary roll are arranged respectively in the width direction of the film, the main roll and the auxiliary roll are in parallel to each other with a sufficient gap for the film to pass between them, and both the main roll and the auxiliary roll are respectively rotatable, (2-b) the processed film is suspended on the main roll and the auxiliary roll through an S-shaped path to allow the main roll and the auxiliary roll to hold the processed film, and after achieving such a film-holding state, the film holding means moves along the mold surface from the downstream side toward the upstream side, in order to peel off the processed film from the mold surface, (2-c) the main roll and the auxiliary roll rotate while the film holding means stays at a position that it has reached after moving to the upstream side, in order to cause a new predetermined length of the processing film to be supplied to the downstream side via the main roll and the auxiliary roll, and after completion of the supply of the new predetermined length of the processing film, (2-d) the main roll is used as the crease formation prevention means, and (2-e) while the film holding means moves along the mold surface from the upstream side toward the downstream side, the main roll rotates as it moves so that the new predetermined length of the processing film is supplied onto the mold surface while preventing creases from being formed in the processing film.

Second illustrative embodiment of the film production method:

The film production method according to another aspect of the invention, wherein (3-a) the film holding means comprises a combination of a main roll that comes in contact with the opposite surface of the film to the surface on which the pattern is formed and an auxiliary roll that comes in contact with the surface of the film on which the pattern is formed, and in the combination, both the roll axis of the main roll and that of the auxiliary roll are arranged respectively in the width direction of the film, the main roll and the auxiliary roll are in parallel to each other with a sufficient gap for the film to pass between them, and both the main roll and the auxiliary roll are respectively rotatable, (3-b) the processed film is suspended on the main roll and the auxiliary roll through an S-shaped path to allow the main roll and the auxiliary roll to hold the processed film, and after achieving such a film-holding state, the film holding means moves along the mold surface from the downstream side toward the upstream side, in order to peel off the processed film from the mold surface, (3-c) the main roll and the auxiliary roll rotate while the film holding means stays k at a position that it has reached after moving to the upstream side, in order to cause a new predetermined length of the processing film to be supplied to the downstream side via the main roll and the auxiliary roll, and after completion of the supply of the new predetermined length of the processing film, (3-d) a rotatable crease-smoothing roll that is located on the upstream side of the main roll, with a space from, and in parallel to, the main roll, and in contact with the opposite surface of the film to the surface on which the pattern is formed, is used as the crease formation prevention means, and (3-e) while the film holding means moves along the mold surface from the upstream side toward the downstream side, the crease-smoothing roll moves, while rotating, in coordination with the movement of the film holding means, in order to prevent the formation of creases in the processing film and simultaneously supply the new predetermined length of the processing film onto the mold surface.

Third illustrative embodiment of the film production method:

The film production method according to another aspect of the invention, wherein (4-a) the film holding means comprises a combination of a main roll that comes in contact with the opposite surface of the film to the surface on which the pattern is formed and an auxiliary roll that comes in contact with the surface of the film on which the pattern is formed, and in the combination, both the roll axis of the main roll and that of the auxiliary roll are arranged respectively in the width direction of the film, the main roll and the auxiliary roll are in parallel to each other with a sufficient gap for the film to pass between them, and both the main roll and the auxiliary roll are respectively rotatable, (4-b) the processed film is suspended on the main roll and the auxiliary roll through an S-shaped path to allow the main roll and the auxiliary roll to hold the processed film, and after achieving such a film-holding state, the film holding means moves along the mold surface from the downstream side toward the upstream side, in order to peel off the processed film from the mold surface, (4-c) while the main roll is prevented from rotating after the film holding means has moved to the upstream side and comes to a halt, the film holding means moves from the upstream side toward the downstream side to supply the new predetermined length of the processing film, (4-d) a rotatable crease-smoothing roll that is located on the upstream side of the main roll, with a space from, and in parallel to, the main roll, and in contact with the opposite surface of the film to the surface on which the pattern is formed, is used as the crease formation prevention means, and (4-e) while the film holding means moves along the mold surface from the upstream side toward the downstream side during the processing film supply process, the crease-smoothing roll moves, while rotating, in coordination with the movement of the film holding means, in order to prevent the formation of creases in the processing film and simultaneously supply the new predetermined length of the processing film onto the mold surface.

A production apparatus for a film having a fine asperity pattern on its surface according to the invention is described below.

A production apparatus for a film having a fine asperity pattern on its surface, comprising:

(5-a) a mold having a mold surface on which a fine asperity pattern is provided, (5-b) a film take-out apparatus to taken out a processing film from a long film strip supply source, (5-c) a film pressing apparatus to press the processing film against the mold surface, (5-d) a film peeling apparatus to peel off from the mold surface a processed film having a fine asperity pattern produced by taking out the processing film from the film take-out apparatus, intermittently supplying it onto the mold surface, and pressing it against the mold surface in the film pressing apparatus to transfer the fine asperity pattern from the mold surface to a surface of the processing film, and (5-e) a film take-up apparatus in which the processed film delivered to the downstream side after being peeled off from the mold surface in the film peeling apparatus is taken up on the long film strip storage source located on the downstream side, thus processing a film in the film pressing apparatus to produce the processed film, peeling it off from the mold surface in the film peeling apparatus, and then delivering the processed film to the film take-up apparatus while another predetermined length of the processing film taken out from the film take-out apparatus is supplied intermittently onto the mold surface, in order to perform repeated production of the processed film by a predetermined length at a time, wherein (5-f) the film peeling apparatus includes a film holding apparatus that holds the processed film while moving from the downstream side to the upstream side in the length direction of the processed film, and (5-g) the film holding apparatus includes a crease formation prevention apparatus to prevent creases from being formed in the processing film supplied onto the mold surface, and the supply of the processing film is performed in coordination with the movement of the crease formation prevention apparatus from the upstream side toward the downstream side in the length direction of the processing film.

The film production apparatus according to an aspect of the invention is preferably in any of the following three illustrative embodiments.

First embodiment of the film production apparatus:

The film production apparatus according to an embodiment of the invention, wherein (6-a) the film holding apparatus comprises a combination of a main roll that can come in contact with the opposite surface of the film to the surface on which the pattern is formed and an auxiliary roll that can come in contact with the surface of the film on which the pattern is formed, (6-b) both the roll axis of the main roll and that of the auxiliary roll are arranged respectively in the width direction of the film, and the main roll and the auxiliary roll are in parallel to each other with a space for the film to pass between them, (6-c) the main roll is supported on a main roll support arm in such a manner that it can rotate around its roll axis, (6-d) the auxiliary roll is supported on an auxiliary roll support arm in such a manner that it can rotate around its roll axis, (6-e) the main roll support arm and the auxiliary roll support arm are fixed to a pedestal, (6-f) the pedestal is supported on a pedestal travelling guide provided in the length direction of the film, in such a manner that it can move in the length direction of the film, (6-g) the film holding apparatus is connected to a film holding apparatus moving means to move the film holding apparatus along the pedestal travelling guide, (6-h) in the film holding apparatus, a processed film is suspended on the main roll and the auxiliary roll through an S-shaped path to allow the main roll and the auxiliary roll to hold the processed film, and in this state, the film holding apparatus is moved by the film holding apparatus moving means from the downstream side to the upstream side, in order to peel off the processed film from the mold surface, (6-i) the main roll and the auxiliary roll rotate while the film holding apparatus stays at a position that it has reached after moving to the upstream side, in order to cause a new predetermined length of the processing film to be supplied to the downstream side via the main roll and the auxiliary roll, (6-j) the main roll is used as the crease formation prevention apparatus, and (6-k) while the film holding apparatus is moved by the film holding apparatus moving means along the mold surface from the upstream side toward the downstream side, the main roll rotates as it moves, so that the new predetermined length of the processing film is supplied onto the mold surface while preventing creases from being formed in the processing film which has already been supplied to the downstream side via the main roll and the auxiliary roll.

In the first embodiment of the film production apparatus, (7-a) it is preferable that the film holding apparatus moving means comprises either or both of the following:

a combination of the main roll and a main roll rotation driving means that positively drives the rotation of the main roll, and a combination of the pedestal and a pedestal driving means that positively moves the pedestal along the pedestal travelling guide.

Second embodiment of the film production apparatus:

The film production apparatus according to the invention, wherein (8-a) the film holding apparatus comprises a combination of a main roll that can come in contact with the opposite surface of the film to the surface on which the pattern is formed and an auxiliary roll that can come in contact with the surface of the film on which the pattern is formed, (8-b) both the roll axis of the main roll and the roll axis of the auxiliary roll are arranged respectively in the width direction of the film, and the main roll and the auxiliary roll are in parallel to each other with a space for the film to pass between them, (8-c) the main roll is supported on a main roll support arm in such a manner that it can rotate around its roll axis, (8-d) the auxiliary roll is supported on an auxiliary roll support arm in such a manner that it can rotate around its roll axis, (8-e) the main roll support arm and the auxiliary roll support arm are fixed to a pedestal, (8-f) the pedestal is supported on a pedestal travelling guide provided in the length direction of the film, in such a manner that it can move in the length direction of the film, (8-g) the film holding apparatus is connected to a film holding apparatus moving means to move the film holding apparatus along the pedestal travelling guide, (8-h) in the film holding apparatus, the processed film travels on the main roll and the auxiliary roll through an S-shaped path to allow the main roll and the auxiliary roll to hold the processed film, and in this state, the film holding apparatus is moved by the film holding apparatus moving means from the downstream side toward the upstream side, in order to peel off the processed film from the mold surface, (8-i) the main roll and the auxiliary roll rotate while the film holding apparatus stays at a position that it has reached after moving to the upstream side, so that the new predetermined length of the processing film is supplied to the downstream side via the main roll and the auxiliary roll, (8-j) a crease-smoothing roll that is located on the upstream side of the main roll, with a space from, and in parallel to, the main roll, and in contact with the opposite surface of the film to the side on which the pattern is formed, is used as the crease formation prevention apparatus, (8-k) the crease-smoothing roll is supported on a crease-smoothing roll support arm in such a manner that it can rotate around its roll axis, and the crease-smoothing roll support arm is fixed to the pedestal, and (8-l) while the film holding apparatus is moved by the film holding apparatus moving means over the mold surface from the upstream side toward the downstream side, the crease-smoothing roll moves, while rotating, in coordination with the movement of the film holding apparatus, in order to prevent the formation of creases in the processing film that has already been supplied to the downstream side via the main roll and the auxiliary roll, and simultaneously supply the new predetermined length of the processing film onto the mold surface.

In the second embodiment of the film production apparatus, (9-a) it is preferable that the film holding apparatus moving means comprises either or both of the following:

a combination of the main roll and a main roll rotation driving means that positively drives the rotation of the main roll, and a combination of the pedestal and a pedestal driving means that positively moves the pedestal along the pedestal travelling guide.

Third embodiment of film production apparatus:

The film production apparatus according to an embodiment of the invention, wherein (10-a) the film holding apparatus comprises a combination of a main roll that can come in contact with the opposite surface of the film to the surface on which the pattern is formed and an auxiliary roll that can come in contact with the surface of the film on which the pattern is formed, (10-b) both the roll axis of the main roll and the roll axis of the auxiliary roll are arranged respectively in the width direction of the film, and the main roll and the auxiliary roll are in parallel to each other with a space for the film to pass between them, (10-c) the main roll is supported on a main roll support arm in such a manner that it can rotate around its roll axis, (10-d) the auxiliary roll is supported on an auxiliary roll support arm in such a manner that it can rotate around its roll axis, (10-e) the main roll support arm and the auxiliary roll support arm are fixed to a pedestal, (10-f) the pedestal is supported on a pedestal travelling guide provided in the length direction of the film, in such a manner that it can move in the length direction of the film, (10-g) the film holding apparatus is connected to a film holding apparatus moving means to move the film holding apparatus along the pedestal travelling guide, (10-h) in the film holding apparatus, the processed film is suspended on the main roll and the auxiliary roll through an S-shaped path to allow the main roll and the auxiliary roll to hold the processed film, and in such a state, the film holding apparatus is moved by the film holding apparatus moving means from the downstream side toward the upstream side, in order to peel off the processed film from the mold surface, (10-i) while the main roll is prevented from rotating after the film holding apparatus has moved to the upstream side and come to a halt, the film holding apparatus is moved by the film holding apparatus moving means over the mold surface from the upstream side toward the downstream side to supply the new predetermined length of the processing film onto the mold surface, (10-j) a crease-smoothing roll that is located on the upstream side of the main roll, with some distance from and in parallel to the main roll, and in contact with the opposite surface of the film to the surface on which the pattern is formed, is used as the crease formation prevention apparatus, (10-k) the crease-smoothing roll is supported on a crease-smoothing roll support arm in such a manner that it can rotate around its roll axis, and the crease-smoothing roll support arm is fixed to the pedestal, and (10-l) while the film holding apparatus is moved by the film holding apparatus moving means over the mold surface from the upstream side toward the downstream side during the processing film supply process, the crease-smoothing roll moves, while rotating, in coordination with the movement of the film holding apparatus, in order to prevent the formation of creases in the processing film, and simultaneously supply the new predetermined length of the processing film onto the mold surface.

In the third embodiment of the film production apparatus, (11-a) it is preferable that the film holding apparatus moving means comprises either or both of the following:

a combination of the main roll and a main roll rotation driving means that positively drives the rotation of the main roll, and a combination of the pedestal and a pedestal driving means that positively moves the pedestal along the pedestal travelling guide.

In any of the first, second and third embodiments of the film production apparatus, (12-a) it is preferable that the external surface of the main roll comprises foam sponge made mainly of a silicone resin or a fluorine resin.

In any of the first, second and third embodiments of the film production apparatus, (13-a) it is preferable that the external surface of the crease-smoothing roll comprises foam sponge made mainly of a silicone resin or a fluorine resin.

The use of the film production method or the production apparatus of the invention serves to produce a film having a good patterned surface.

More specifically, the film production method and the film production apparatus according to aspects of the invention are designed so that a patterned film is continuously peeled off in the length direction of a mold surface by a film holding means that moves in the length direction of the mold surface, thus depressing the formation of peel flaws, or mold release marks, on a film surface. Furthermore, a crease formation prevention means, which moves as a processing film is supplied, is provided to depress local lifting from the mold surface and creasing of a predetermined-length portion of the processing film that is supplied next over the mold surface. As a result, a film having excellently patterned surface free of significant creases or undulation can be produced even from a processing film that is thin or low in rigidity.

According to the first or second illustrative embodiment of the film production method of the invention or the first or second illustrative embodiments of the film production apparatus of the invention, a processing film is supplied onto a mold surface as a rotating roll moves over the entire length of the mold surface in its length direction, so that the film is supplied and creases are smoothed without allowing the mold surface to scrape the film. This serves to decrease damage to the mold surface and depress the formation of creases and undulation.

According to the third illustrative embodiment of the film production method of the invention or the third illustrative embodiments of the film production apparatus of the invention, the movement of a film holding means causes a film to be supplied over a mold surface as the film is taken out simultaneously from a film supply source. In addition, a crease-smoothing roller moves while rotating to smooth creases in the film, in coordination with the movement of a film holding means. This serves to shorten the time required for forming a pattern on many predetermined-length portions of the film supplied one by one, and also to depress the formation of creases and undulation during the processing.

REFERENCE SIGNS LIST

Figure 1:
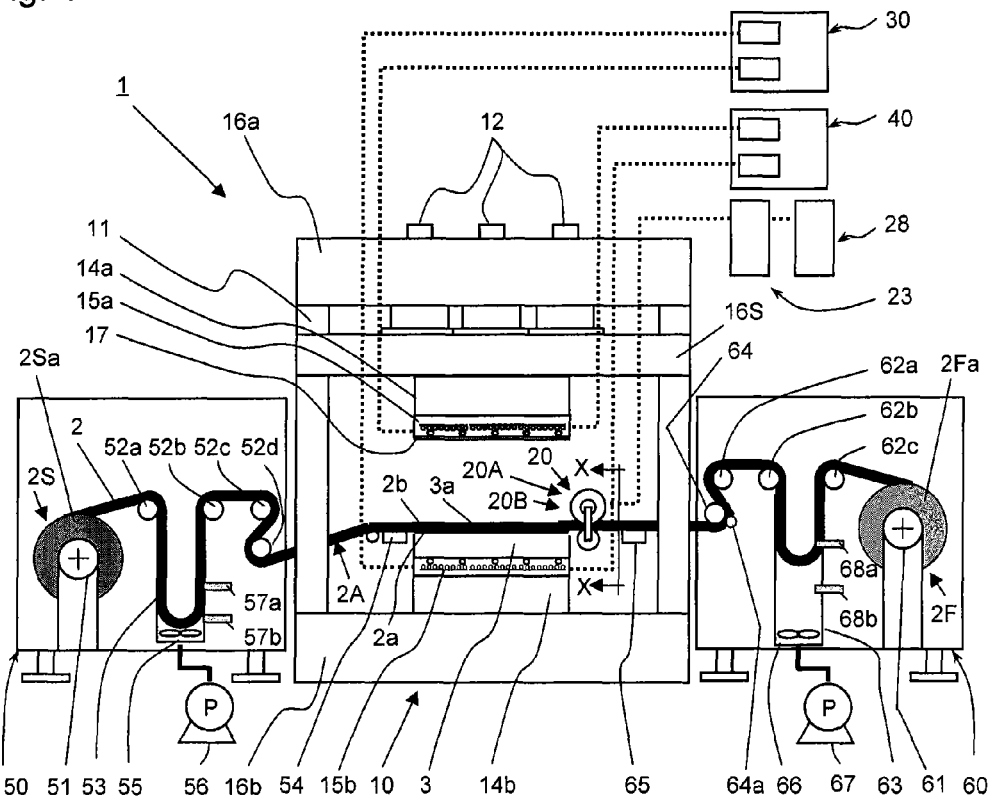
FIG. 1 shows a schematic side view of an example of the film production apparatus in one aspect of the invention.

1: film production apparatus
2: film (film to be processed)
2A: film transportation path
2F: film storage source (processed film roll)
2Fa: film roll
2S: film supply source (processing film roll)
2Sa: film roll
2a: film surface to be patterned (forming surface)
2b: opposite surface to the film surface to be patterned (forming surface)
3: mold
3a: mold surface
10: film pressing apparatus
11: column
12: press cylinder
14a: upper pressing plate
14b: lower pressing plate
15a: upper heat regulation plate
15b: lower heat regulation plate
16S: movable base
16a: upper fixed base
16b: lower fixed base
17: elastic plate
20: film holding apparatus
20A: film peeling apparatus
20B: crease formation prevention apparatus
21: main roll (peeling roll)
21Aa, 21Ab: a pair of main roll support arms
22: auxiliary roll
22Aa, 22Ab: a pair of auxiliary roll revolution support arms
22Ba, 22Bb: a pair of auxiliary roll revolution driving axes
22Ca, 22Cb: a pair of auxiliary roll support arms
22Da, 22Db: a pair of crease-smoothing roll support arms
22p: stand-by position (original position, initial position)
23: main roll (peeling roll) rotation driving means
24: auxiliary roll revolution driving means
25a, 25b: a pair of pedestal travelling guides
26a, 26b: a pair of pedestals
28: main roll rotation controller
29: film holding apparatus movement driving means
30: heating unit
40: cooling unit
50: film take-out apparatus
51: unwind roll rotation driving means
52a, 52b, 52c, 52d: transportation roll
53: unwind buffer unit
54: film fixation unit
55: box
56: suction exhaust means
57a, 57b: sensor
60: film take-up apparatus
61: wind-up roll rotation driving means
62a, 62b, 62c: transportation roll
63: wind-up buffer unit
64: transportation driving roll
64a: nip roll
65: film fixation unit
66: box
67: suction exhaust means
68a, 68b: sensor
70: film tension adjustment means
71: guide roll
72: tension detection roll
73: tension detection means
401: film production apparatus
420B: crease formation prevention apparatus
421: crease-smoothing roll
701: film production apparatus
A: upstream side
B: downstream side
C: normal rotation direction
D: rotate in the reverse direction
H: distance (clearance) between main roll or crease-smoothing roll and mold surface

DETAILED DESCRIPTION OF THE INVENTION

Described below are illustrative embodiments of some film production apparatuses designed to carry out a film production method of the invention. Aspects of the film production method of the invention will be understood well by reading the description of each production apparatus.

Figure 2:
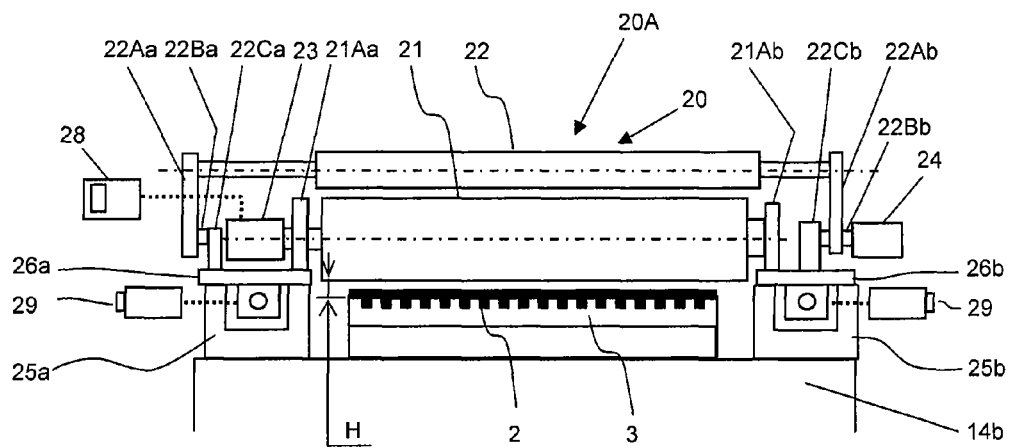
FIG. 2 shows the X-X cross section indicated by arrows in FIG. 1.
Figure 3:
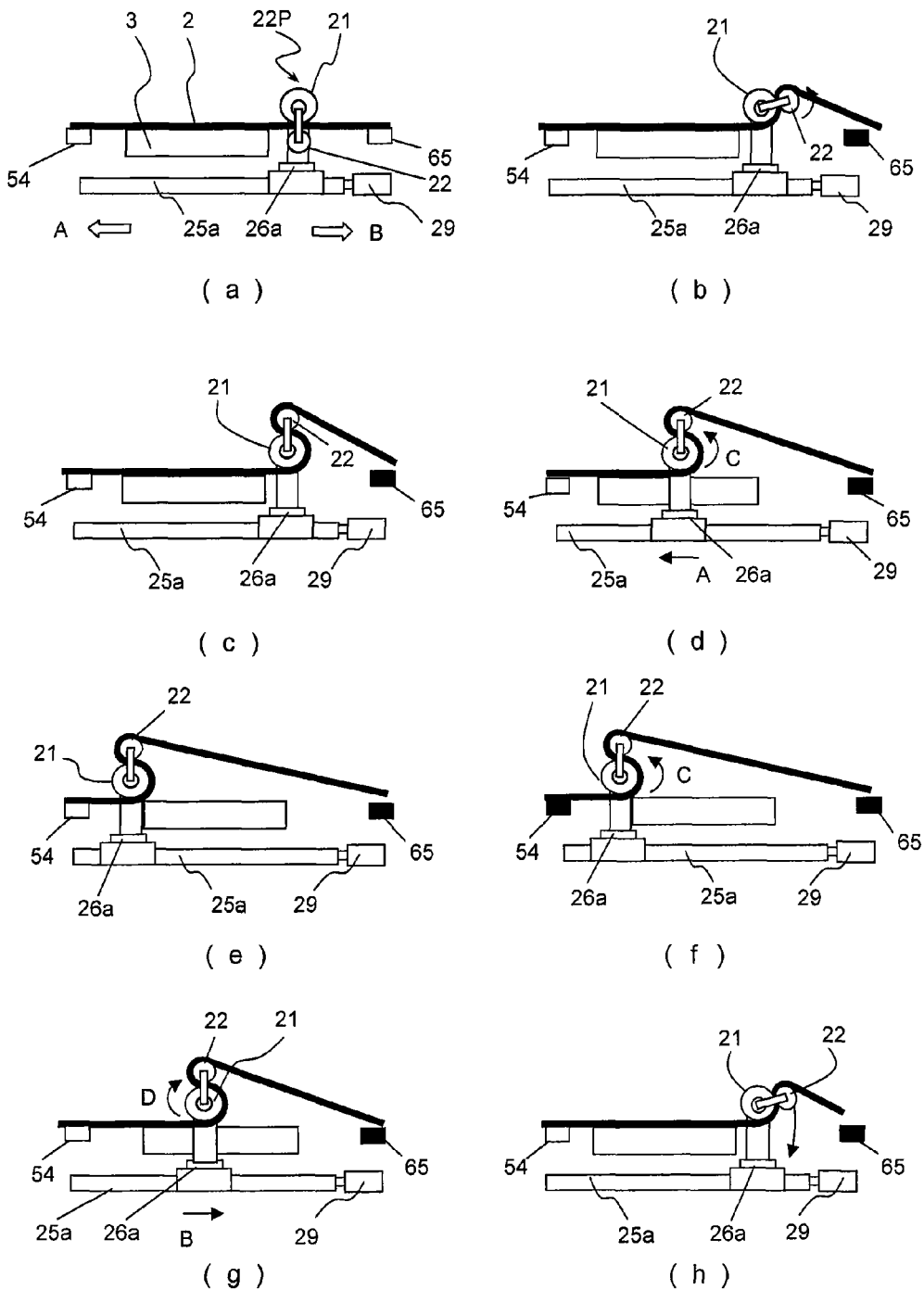
FIG. 3 shows the workings of major functional components in the first illustrative embodiment of the film production method of the invention that comprises the apparatus given in FIG. 1. The diagrams (a) to (h) in FIG. 3 illustrate time-series change of the workings.

FIG. 1 shows a schematic side view of an example of the first illustrative embodiment of the film production apparatus of the invention. FIG. 2 shows the X-X cross section indicated by arrows in FIG. 1. FIG. 3 shows the workings of major functional components in the first illustrative embodiment of the film production method of the invention that comprises the film production apparatus given in FIG. 1. The diagrams (a) to (h) in FIG. 3 illustrate time-series change of the workings.

FIG. 1 shows a film production apparatus 1 according to an embodiment of the invention. The film production apparatus 1 is equipped with a mold 3 having a fine irregular pattern on its surface (mold surface) 3a. A film take-out apparatus 50 to take out a film (processing film) 2 from a long film strip supply source (processing film roll) 2S is installed on the upstream side of the mold 3.

The film production apparatus 1 is equipped with a film pressing apparatus 10 to press the film 2 supplied onto the mold surface 3a against the mold surface 3a.

The film production apparatus 1 is equipped with a film peeling apparatus 20A to peel off from the mold surface 3a the film having a fine irregular pattern (processed film) produced by taking out the film 2 from the film take-out apparatus 50, intermittently supplying it onto the mold surface, and pressing the film 2 against the mold surface 3a in the film pressing apparatus 10 to transfer a fine irregular pattern from the mold surface 3a to a surface (forming surface) 2a of the film 2.

The film production apparatus 1 is equipped with a film take-up apparatus 60 that allows a long film strip storage source (processed film roll) 2F located on the downstream side to take up the film (processed film) peeled off from the mold surface 3a by the film peeling apparatus 20A and delivered toward the downstream side. A film transportation path 2A is formed between the film take-out apparatus 50 and the film take-up apparatus 60. The film take-out apparatus 50 and the film take-up apparatus 60 constitute a film transportation apparatus that transports predetermined-length portions of the film 2 through the film transportation path 2A.

The film peeling apparatus 20A is equipped with a film holding apparatus 20. The film holding apparatus 20 holds the film 2 and moves in the length direction of the film 2. As the film holding apparatus 20 moves from the downstream side to the upstream side, the processed film having a patterned surface is peeled off from the mold surface 3a. In addition, the film holding apparatus 20 is equipped with a crease formation prevention apparatus 20B. The crease formation prevention apparatus 20B moves in the length direction of the mold 3. Formation of creases in the processing film on the mold surface 3a is prevented as the crease formation prevention apparatus 20B moves from the upstream side to the downstream side in coordination with the supply of the processing film over the mold surface 3a.

The film pressing apparatus 10 has a lower fixed base 16b, and the lower fixed base 16b is equipped with four columns 11, with an upper fixed base 16a mounted on the four columns 11. Below the upper fixed base 16a, a movable base 16S is connected to the columns 11 in such a manner that it can move vertically. An upper pressing plate 14a is fixed to the lower face of the movable base 16S, and an upper heat regulation plate 15a is fixed to the lower face of the upper pressing plate 14a. A lower pressing plate 14b is fixed to the upper face of the lower base 16b, and a lower heat regulation plate 15b is fixed to the upper face of the lower pressing plate 14b. The mold 3 is fixed to the upper face of the lower heat regulation plate 15b. A fine irregular pattern is formed on the mold surface 3a.

The upper fixed base 16a is equipped with a press cylinder 12, and a piston rod extending from the press cylinder 12 is connected to the movable base 16S. The press cylinder 12 works to move the movable base 16S downward to press the film 2 against the mold surface 3a. The press cylinder 12 also works to move the movable base 16S upward to release the film 2 from the mold surface 3a.

The upper heat regulation plate 15a is used for heating or cooling of the film 2 while the film 2 is pressed against the mold surface 3a, and its temperature is controlled by a heating unit 30 or a cooling unit 40. The lower heat regulation plate 15b, on the other hand, is used for heating or cooling of the mold 3 while the film 2 is pressed against the mold surface 3a, and its temperature is controlled by the heating unit 30 or the cooling unit 40.

The mold 3 may be fixed to the lower face of the upper heat regulation plate 15a. The flatness of each surface in the film pressing side of the upper heat regulation plate 15a and the lower heat regulation plate 15b is preferably 10 μm or less, more preferably 5 μm or less. The pattern formation process is not limited only to hot forming, and for instance, a process using light may be utilized. The upper and lower heat regulation plates and the heating cooling units connected to them are not necessary if a process other than hot forming is used.

The press cylinder 12 is connected to an oil pressure pump which is not shown in the figure. The oil pressure pump works to control the vertical movement and the applied pressure of the upper pressing plate 14a. The pressing mechanism may be a pressurization mechanism that can control the applied pressures of units other than the hydraulic type press cylinder.

The pressure applied for the pattern formation is preferably 0.1 MPa to 20 MPa. It is more preferably 1 MPa to 10 MPa. The mold can break or deform if the pressure is higher than 20 MPa. If the pressure is less than 0.1 MPa, a resin constituting the film will not able to flow sufficiently during the pattern formation process, making it impossible to transfer the pattern on the mold surface to the film surface precisely.

The pressure increase rate of the press cylinder is preferably 0.01 MPa/sec to 10 MPa/sec. It is more preferably 0.05 MPa/sec to 5 MPa/sec. If the pressure raising rate is higher than 10 MPa/sec, the resin constituting the film can fail to deform smoothly to follow the pressure increase, making it impossible to transfer the pattern on the mold surface to the film surface precisely. If the pressure increase rate is less than 0.01 MPa/sec, the pattern formation step requires a lengthy time, leading to a low productivity.

The fine asperity pattern on the mold surface 3a is formed by, for instance, machine processing, laser processing, photolithography, or electronic beam drawing. The roughness height of the fine asperity pattern is commonly in the range of 10 nm to 1 mm, and the asperity period is commonly in the range of 10 nm to 1 mm. The roughness height of the fine asperity pattern is preferably in the range of 1 μm to 100 μm. The asperity period is preferably in the range of 1 μm to 100 μm. To form the convex portions of the rough surface, various types of protrusions are used to meet the target optical products. These protrusions are commonly arranged discretely or in a dot-like manner over the mold surface 3a. The protrusions may be in the shape of triangular pyramid, circular cone, square pillar, or lens-like shape. As other example of protrusion arrangement, protrusions with triangular, rectangular, trapezoidal, semicircular, or elliptic cross sections may be arranged to form stripes.

The material of the mold is selected on the basis of strength under pressure, pattern processing accuracy, and film's releasability. Useful materials include, for instance, stainless steel, nickel, metal materials containing copper etc., silicone, glass, ceramics, and resin. Organic film may be provided on the mold surface, as needed, in order to improve releasability.

An elastic plate 17 having a heat resistant temperature of 130° C. or more is preferably fixed to the lower face of the upper heat regulation plate 15a. If the film 2 has some degree of thickness irregularity, the existence of the elastic plate 17 serves to allow the film 2 to be pressed uniformly over the entire surface of the mold surface 3a. The elastic plate 17 may be a 0.3 mm to 1.0 mm thick sheet of, for instance, ethylene-propylene-diene rubber (EPDM), silicone rubber, or fluorine rubber. The surface of the elastic plate 17 is preferably treated to allow the plate to slide smoothly on the surface of the film 2. Here, the heat resistant temperature of a material is defined as the temperature at which the material suffers a 10% change in the tensile strength when left to stand for 24 hours.

In FIG. 2, the film holding apparatus 20 in the film peeling apparatus 20A comprises a combination of a main roll 21 that can come in contact with the opposite surface 2b of the film 2 to the surface 2a on which the pattern is formed (forming surface) and an auxiliary roll 22 that can come in contact with the side of the film 2 on which the pattern is formed. Both the roll axis of the main roll 21 and the roll axis of the auxiliary roll 22 are arranged in the width direction of the film 2, and the main roll 21 and the auxiliary roll 22 are provided in parallel to each other with a sufficient gap between them for the film 2 to pass through.

The ends of the main roll 21 are supported on a pair of main roll support arms 21Aa and 21Ab in a rotatable manner. The ends of the auxiliary roll 22 are supported on a pair of auxiliary roll revolution support arms 22Aa and 22Ab in a rotatable manner. The pair of auxiliary roll revolution support arms 22Aa and 22Ab are fixed to a pair of auxiliary roll revolution driving axes 22Ba and 22Bb. The pair of auxiliary roll revolution driving axes 22Ba and 22Bb are supported on a pair of auxiliary roll support arms 22Ca and 22Cb in a rotatable manner. An auxiliary roll revolution driving means 24 is connected to one auxiliary roll revolution driving axis 22Ba to allow the auxiliary roll 22 to revolve in the normal or reverse direction along the circumferential surface of the main roll 21. An actuator comprising, for instance, an electromagnetic motor or pneumatic pressure is used as the auxiliary roll revolution driving means 24.

The embodiment wherein the auxiliary roll is supported in such a manner that it revolves around the main roll represents an example in which the film is repeatedly held in an S-shaped path between the main roll and the auxiliary roll and released from that state. The relation between the main roll and the auxiliary roll is not limited to this. There are no specific limitations on the means of moving the auxiliary roll near the circumferential surface of the main roll if the film can be held in an S-shaped path. If it is possible to hold the film in an S-shaped path, that state may be maintained, that is, the constitution may be such that the film cannot be released from the state.

The lower ends of the pair of main roll support arms 21Aa and 21Ab are fixed to a pair of pedestals 26a and 26b provided on either side along the length of the mold 3, and the lower ends of the pair of auxiliary roll support arms 22Ca and 22Cb are also fixed to a pair of pedestal 26a and 26b.

The pair of pedestals 26a and 26b are supported on a pair of pedestals travelling guides 25a and 25b provided on either side along the length of the mold 3 in such a manner that it can move in the length direction of the mold 3, and at the same time, the film holding apparatus 20 is equipped with a film holding apparatus movement driving means 29 to move the film holding apparatus 20 along the pair of pedestals travelling guides 25a and 25b. As the film holding apparatus movement driving means 29, a linear drive motor (servomotor) is suitable, but an electromagnetic actuator or a pneumatic actuator may also be used.

In the film holding apparatus 20, the auxiliary roll 22 is driven by the auxiliary roll revolution driving means 24 to revolve around the main roll 21, and the processed film is held on the main roll 21 and the auxiliary roll 22 in an S-shaped path, achieving a processed film gripping state on the main roll 21 and the auxiliary roll 22. After the formation of the gripping state, the film holding apparatus 20 is moved by the film holding apparatus moving means 29 from the downstream side to the upstream side, achieving the peeling of the processed film from the mold surface 3a.

Subsequently, the main roll 21 and the auxiliary roll 22 rotate while the film holding apparatus 20 is kept still at the position that it has reached after moving to the upstream side, in order to cause a new predetermined length portion of the processing film to be supplied to the downstream side via the main roll 21 and the auxiliary roll 22.

Here, in this illustrative embodiment, the main roll 21 is used as the crease formation prevention apparatus 20B, and as the film holding apparatus 20 is moved by the film holding apparatus moving means 29 over the mold surface 3a from the upstream side to the downstream side, the main roll 21 moves while rotating, so that crease formation in the processing film that has already been supplied to the downstream side via the main roll 21 and the auxiliary roll 22 is prevented as a new predetermined length portion of the processing film is supplied over the mold surface 3a.

This illustrative embodiment comprises a main roll rotation driving means 23 connected to the roll axis of the main roll 21, and a main roll rotation controller 28 connected to the main roll rotation driving means 23 to control the rotation direction and the rotation rate (roll circumferential speed) of the main roll 21. It is preferable that a servomotor is used as the main roll rotation driving means 23, and a servo amplifier is used as the main roll rotation controller 28. In the case where the rotation of the main roll 21 is driven by the main roll rotation driving means 23, it is preferable that the speed of rotational movement (circumferential speed) of the main roll 21 caused by the main roll rotation driving means 23 is synchronized with the speed of the film holding means 20 moved by the film holding apparatus movement driving means 29 along the pair of pedestals travelling guides 25a and 25b as they are driven.

To peel off the film 2, it is preferable that the rotation of the main roll 21 is maintained, and that the peeling is carried out while the film holding means 20 is moved by the film holding apparatus movement driving means 29 to the upstream side. By allowing the film holding means 20 to be moved to and fro by the film holding apparatus movement driving means 29, it is made possible that the peeling of the processed film from the mold surface 3a and the supply of the processing film over the mold surface 3a can be performed without forcedly pulling the film 2 from downstream side. This serves not only to prevent crease formation in the mold surface 3a but also to prevent local stretching in parts of the processing film heated on the mold surface 3a, depressing the formation of undulation in the processed film after the pattern formation step. Formation of creases is also depressed during the transportation of the film immediately after the peeling.

If the friction between the surface of the film 2 and the circumferential surface of the main roll 21 is sufficiently high, the frictional force and the tension acting on the film 2 alone can produce a sufficient force to move the film holding means 20 along the pair of pedestals travelling guides 25a and 25b. In this case, it is not necessary for the film holding apparatus movement driving means 29 to work to actively move the pair of pedestals 26a and 26b.

With respect to the circumferential surface of the main roll 21, it is preferable that at least that part of the circumferential surface that comes in contact with the film 2 is formed of foam sponge composed mainly of silicone resin or fluorine resin so that the fine asperity pattern on the mold surface 3a will not be damaged as the film 2 is brought in contact with or pressed against the mold surface 3a during its supply step, and also that the surface of the main roll 21 will not degraded by the high-temperature heat of the mold surface 3a. High crease-smoothing effect is achieved as the main roll 21 causes the film 2 to be in contact with or pressed against the mold surface 3a as it moves.

The circumferential surface of the main roll 21 may be of rubber with a certain degree of elasticity and adhesiveness. In this case, it is preferable that the rubber has a rubber hardness (JIS K6253) in the range of 40 to 70, more preferably 50 to 60. The circumferential surface of the main roll 21 preferably has a center line average roughness (JIS B0601) in the range of 0.01 µm to 1.0 µm, more preferably 0.01 µm to 0.5 µm. The preferred rubbers include ethylene-propylene-diene rubber (EPDM), silicone rubber, and fluorine rubber.

If the rubber hardness is larger than 70, or if the center line average roughness is larger than 1.0 µm, the film 2 and the main roll 21 will be unable to make a sufficiently good contact between them. In this case, slippage can take place between the between the film 2 and the main roll 21 during the peeling of the film, leading to a decrease in the tension of the film 2 to reduce the peeling force. If the rubber hardness is less than 40, the rubber can suffer a large deformation during the peeling motion, leading to unstable peeling motion. In such cases, flaws may be caused on the film surface by the peeling. Furthermore, it would be difficult to produce a main roll having a center line average roughness of less than 0.01 µm.

During the peeling of the film from the mold surface, and during its supply onto the mold surface, the main roll may come in contact with the surface opposite to the mold-side surface of the film that is in contact with the mold surface. In such a case where the peeling motion and the supply motion are performed with the main roll being in contact with the surface of the film located on the mold surface, it is preferable that the pressure applied by the main roll to press film against the mold surface can be controlled. For instance, it is preferable that both ends of the roll axis of the main roll are provided with a main roll pressure adjustment means composed of an elastic member such as air cylinder and spring to control the pressure applied by the main roll in the direction toward the mold surface. Thus, the peeling performance and crease-smoothing effect are enhanced if an appropriate pressure is applied when the main roll comes in contact with the surface of the film located on the mold surface.

If the film is so thin, or so highly deformable in the thickness direction, and the asperity pattern on the mold surface is so fine that the mold surface is likely to suffer damage when the main roll comes in contact with the mold surface, it is preferable that the distance (clearance) H between the circumferential surface of the main roll and the mold surface is in the range of 0.1 mm to 5 mm, more preferably 0.1 mm to 1 mm, as shown in FIG. 2.

In view of the peeling motion and supply motion of the film, the clearance H is preferably 5 mm or less. Specifically, it is preferable because if the clearance H is 5 mm or less when the film is being peeled, the point of peeling of the film from the mold surface is located nearly immediately below the main roll to allow the peeling point to move continuously with the movement of the main roll. It is also preferable in view of crease formation prevention, because the film being supplied can maintain a high flatness if the clearance H is 5 mm or less when the film is being peeled.

If the clearance H exceeds 5 mm, the point of peeling can stops moving during the peeling of the film, or the point of peeling can move toward the upstream side at a speed equal to or higher than the circumferential speed of the main roll, leading to discontinuous movement of the point of peeling. Stripe-like peeling flaws can be left in the width direction of the film at the place where the point of peeling has stopped. During the film supply motion, this can lead to a decreased flatness of the film on the mold surface.

If the clearance H is less than 0.1 mm, the mold surface can come in contact with the main roll, and in the case of such a contact, it can cause damage to the fine asperity pattern on the mold surface. The parallelism between the main roll and the mold surface is preferably 0.5 mm or less, more preferably 0.1 mm or less.

The parallelism between the main roll and the mold surface with respect to the mold surface can be measured with a displacement sensor installed on both ends in the width direction of the film. Specifically, the difference between both ends in the distance from the mold surface to the roll external surface is measured the main roll comes directly above the displacement sensor, and the measured difference is taken as the degree of parallelism.

Cooling water may be circulated through either the main roll or the auxiliary roll, or both of them, for heat regulation to maintain the roll(s) at a constant temperature. The film is heated at a high temperature when it is peeled off from the mold surface, and therefore, it is preferable that the main roll and the auxiliary roll are provided with a heat regulation means to ensure that the temperature of the rolls, which are in contact with the film during its peeling, is maintained as constant as possible. This can lower the temperature to film during and immediately after the peeling. It also serves to stabilize the transportation and winding-up of the processed film.

A vibrating means may be provided on the roll axis of the main roll so that the main roll vibrates minutely in the axis direction during peeling of the film. The vibration driving element used in the vibrating means may be, for instance, an electromagnetic actuator, linear actuator, or ultrasonic oscillator. It will be effective of the vibrating means is designed only to vibrate the external surface of the main roll. As the entire body of the main roll or the external surface of the main roll is vibrated, the vibration propagates to the point of peeling through the film on the main roll to permit smooth peeling of film.

For stable peeling of the film from the mold surface, it is preferable that an appropriate frictional force required for the peeling takes place between the main roll and the film. To achieve this, it is preferable that the contact length between the film and the main roll in the film length direction can be adjusted in the range of 30 mm to 300 mm. Specifically, it is preferable that the main roll has a diameter in the range of 50 mm to 200 mm. Depending on the position the revolving auxiliary roll relative to the main roll, if the diameter of the main roll is less than 50 mm or so, the angle subtended by the film in contact with the main roll can be too small to maintain a sufficient frictional force on the contact surface. In this case, a sufficient peeling force will not be produced, or the main roll will not be able to carry the film forward due to slippage. In cases where the diameter of the main roll is less than 50 mm, the curvature of the film will be too large, causing deformation such as curling of the film, if the film starts to move along the circumferential surface of the main roll immediately after its release from the mold. If the diameter of the main roll is more than 200 mm, a large space will be required to allow the peeling motion. It will likely be difficult to maintain such a large space in the film pressing apparatus in consideration of apparatus design.

To improve the film productivity, it is preferable to increase the speed of the peeling motion. However, as the peeling speed is increased, air will likely be taken between the main roll and the film during the peeling, causing slippage to occur easily between them. If such slippage occurs, the point of peeling of the film from the mold surface will shift discontinuously to cause peeling flaws. It will be effective to increase the slip-limit speed in order to prevent slippage from taking place during high-speed peeling. To increase the slip-limit speed, it is effective to decrease the diameter of the main roll and increase the surface roughness of the main roll while maintaining an appropriate subtended angle made by the film in contact with the main roll.

Depending on the material of the film or the shape of the pattern to be formed, it is preferable that the peeling speed is roughly in the range of 10 m/min to 100 m/min. It is more preferably 20 m/min to 60 m/min. The productivity will be extremely low if the peeling speed is less than 10 m/min, while air will be easily taken between the surface of the main roll and the film, if the peeling speed exceeds 100 m/min, leading to slippage.

Of the circumferential surface of the auxiliary roll 22, at least that portion of the circumferential surface with which the film 2 can come in contact may be made of the same material as that of the circumferential surface of the main roll 21. Creases can be cause in the film on the surface of the auxiliary roll if the friction resistance between the auxiliary roll and the film is high. In such cases, it is preferable that the circumferential surface of the auxiliary roll is made of fluorine resin, metal, or other materials that slip smoothly.

Depending on the material of the film or the temperature of the film, it is preferable that the tension applied to the film during peeling is roughly in the range of 1 to 100 N. It is more preferably 5 to 50 N.

It is preferable that the materials that form the circumferential surfaces of the main roll and the auxiliary roll have a heat resistant temperature of 100° C. or more, more preferably 130° C. or more. These rolls come in contact with a high-temperature film, and can suffer changes in size or decline in strength over time at high temperatures. Thus, the material forming the circumferential surface should preferably have a heat resistant temperature in the range. It will serve to prevent failure in peeling. The heat resistant temperature referred to here is as defined above.

The upper heat regulation plate 15a and the lower heat regulation plate 15b are both made of an aluminum alloy, and each plate contains an electric heating heater. The temperature of each electric heating heater is controlled by the heating unit 30. A heating medium flowing passage may be provided in each heat regulation plate to allow a heating medium to pass for temperature control of each plate.

Barrel Therm (supplied by Matsumura Oil Co., Ltd.), NeoSK-OIL (supplied by Soken Tecnix Co., Ltd.), or water heated up to 100° C. or more, for instance, may be used as the heating medium. For efficient heat transfer, it is preferable that the Reynolds number in the heating medium flow channel is in the range of $1.0 \times 10^4$ to $12 \times 10^4$.

With respect to the heating means for the heat regulation plate, the temperature in two or more portions of the heat regulation plate can be controlled separately if two or more cast heaters or cartridge heaters are used.

With respect to the heat regulation plate, it is preferable that the temperature difference in different portions of the plate is within 10° C., more preferably within 5° C., at the heating, cooling, and constant temperature stages.

Instead of using a heat regulation plate for temperature adjustment of the mold 3, or in addition to the heat regulation plate, a heating medium flowing passage may be provided in the mold to use a heating medium for direct heat regulation of the mold.

A refrigerant flowing passage is provided in the upper heat regulation plate 15a and the lower heat regulation plate 15b to allow a refrigerant to pass for temperature control of each plate. The temperature control of the plate with the refrigerant is achieved by the cooling unit 40.

The best refrigerant is water, but others such as ethylene glycol solution may be used. The temperature of the refrigerant is preferably in the range of 10° C. to 50° C. For efficient heat transfer, the Reynolds number in the refrigerant flowing passage is preferably in the range of $1.0 \times 10^4$ to $12 \times 10^4$.

The film take-out apparatus 50 includes the film supply source 2S. The film supply source 2S commonly comprises a film roll 2Sa carrying a wound-up film (processing film). The film roll 2Sa is supported, in a rotatable manner, on a roll rotation axis provided on a pair of support arms extending from the base. A unwind roll rotation driving means 51 is provided on the end of each roll rotation axis. The film take-out apparatus 50 further includes transportation rolls 52a, 52b, 52c and 52d, an unwind buffer unit 53, and a film fixation unit 54.

The film take-up apparatus 60 includes the film storage source 2F. The film storage source 2F commonly comprises a film roll 2Fa carrying a wound-up film (processed film). The film roll 2Fa is supported, in a rotatable manner, on a roll rotate axis provided on a pair of support arms extending from the base. A wind-up roll rotation driving means 61 is provided on the end of each roll rotate axis. The film take-up apparatus 60 further includes transportation rolls 62a, 62b, and 62c, a wind up buffer unit 63, a transportation driving roll 64, and a film fixation unit 65.

The unwind buffer unit 53 comprises a box 55 and a suction exhaust means 56 connected thereto. The wind-up buffer unit 63 comprises a box 66 and a suction exhaust means 67 connected thereto. Each of the suction exhaust means 56 and 67 may be a vacuum pump or any other device that can perform suction and exhaust of air. As the air is exhausted from the boxes 55 and 66, a pressure difference is caused between the surfaces of film inserted in the boxes in order to apply tension to the film and simultaneously hold the film in a U-shape in the boxes.

It is preferable that the length of the film portion staying the boxes is roughly equal to the intermittent delivery length of the film transported on both sides of the film processing. Sensors 57a and 57b are installed in the box 55. Sensors 68a and 68b are installed in the box 66. These sensors work to detect the positions of the film in the boxes.

After the peeling of the film by the peeling apparatus 20A, transportation of the film is performed in the step of supplying a new predetermined length of the processing film toward the mold 3 and the step of taking up the peeled processed film from the mold 3. During this transportation of the film, the unwind roll rotation driving means 51 or the wind-up roll rotation driving means 61 is actuated when the sensors in the boxed detect that the film is out of the predetermined position. If the unwind roll rotation driving means 51 is actuated, the processing film is supplied to the box 55 so that a predetermined length of the processing film is in place in the box 55. If the wind-up roll rotation driving means 61 is actuated, on the other hand, the processing film is supplied to the box 66 so that a predetermined length of the processing film is in place in the box 66.

The film fixation unit 54 is located on the side of the film transportation path 2A to stop or allow the travel of the film in its length direction. The film fixation unit 65 is located on the side of the film transportation path 2A between the mold 3 and the transportation roll 62a to stop or allow the travel of the film in its length direction. Each of the film fixation units 54 and 65 commonly comprises an air suction box composed of flat plates with their upper face having many suction holes. The stopping and allowing of the travel of the film may be achieved by means of a mechanical clipping mechanism instead of this air suction mechanism.

The film is pressed by the action of the film pressing apparatus 10, and during the pattern formation step, both the film fixation unit 54 and 65 are actuated to restrain the movement of the film. During the step of peeling off the film from the mold surface, the film fixation unit 54 is actuated to fix the film and release the film fixation unit 65. Both the film fixation units 54 and 65 are released as the film is transported from upstream side toward the downstream side.

The transportation driving roll 64 is connected to a rotation driving means such as motor (not shown in the figure). For transportation of the film, the nip roll 64a comes close to the transportation driving roll 64, and under torque control by the film transportation driving roll 64, the film is transported under a constant tension.

The first illustrative embodiment of the film production method of the invention is described below with reference to the film production apparatus 1 illustrated in FIGS. 1 to 3 that is used to implement it. The film production process comprises a series of steps from (A) to (K) described below.

(A) First, the mold 3 is installed on the upper face of the lower heat regulation plate 15b. Then, the film roll (processing film roll) 2Sa is set in the film take-out apparatus 50. Subsequently, initial passing of the film is carried out through the transportation path 2A from the film take-out apparatus 50 to the film take-up apparatus 60. Specifically, the film 2 taken out from the film roll 2Sa in the film take-out apparatus 50 is delivered via the transportation roll 52a, box 55 in the unwind buffer 53, transportation rolls 52b, 52c, and 52d, film fixation unit 54, mold surface 3a, film holding apparatus 20, film fixation unit 65, transportation driving roll 64, transportation rolls 62a and 62b, box 66 in the wind-up buffer 63, and transportation roll 62c, and finally wound up in the film take-up apparatus 60 to form a film roll 2Fa, thus completing the initial passing of the film through the film transportation path 2A.

(B) Then, the heating unit 30 is actuated to heat the upper heat regulation plate 15a and the lower heat regulation plate 15b up to prescribed processing temperatures.

(C) Subsequently, the film pressing apparatus 10 is actuated to lower the upper heat regulation plate 15a so that the film 2 is pressed between the mold surface 3a and the upper heat regulation plate 15a. At this point, the film fixation unit 54 and the film fixation unit 65 are actuated to restrain the movement of the film 2. The required conditions regarding the temperature for forming an asperity pattern on the film, press pressure, pressure raising rate, and press time depend on the film properties and the shape of the asperity pattern such as aspect ratio in particular. Commonly, the processing temperature is adjusted in the range of 100° C. to 180° C., press pressure 1 MPa to 10 MPa, press time 1 to 60 seconds, and pressure raising rate 0.05 MPa/sec to 1 MPa/sec.

(D) After the completion of the simultaneous heating and pressing, the cooling unit 40 is actuated to cool the upper heat regulation plate 15a and the lower heat regulation plate 15b. It is preferable that pressing is continued during the cooling. The cooling is continued until the mold surface 3a reaches an optimum temperature for peeling of the film. It is preferable, for instance, to cool the mold surface 3a until the mold surface 3a reaches a temperature equal to or below the glass transition point of the film.

(E) After the completion of the cooling, the press pressure is released. Subsequently, the upper heat regulation plate 15a is lifted to produce a space in the film pressing apparatus 10 to allow the film holding apparatus 20 to move in the length direction of the mold 3.

(F) After the completion of the rise of the upper heat regulation plate 15a, the film fixation unit 65 is released, and the auxiliary roll revolution driving means 24 is actuated to allow the auxiliary roll 22 to revolve and rise above the main roll 21. This revolution of this auxiliary roll 21 around the main roll 21 causes the film 2 to be held on the main roll 21 and the auxiliary roll 22 through an S-shaped path to achieve the holding of the film 2 on the two rolls. The state of the film 2 held on the main roll 21 and the auxiliary roll 22 through an S-shaped path can be referred to as the film 2's clinging-to-roll state.

FIGS. 3(a) to (c) schematically show the movement process of the auxiliary roll 22 from a stand-by position 22P for the main roll 21 and the auxiliary roll 22 to this clinging state. As the auxiliary roll 22 starts to revolute from the stand-by position 22P, the film 2 is released from the restrained state in the film fixation unit 65. Thus, the film fixation unit 65 is caused to stop working. In FIG. 3(b), this pause of the film fixation unit 65 is indicated by a black rectangle for the film fixation unit 65. In FIG. 3(f), the film fixation unit 54 at pause is similarly indicated by a black rectangle for the film fixation unit 54.

(G) Subsequently, the main roll rotation driving means 23 is actuated to rotate the main roll 21 in the normal rotation direction (the direction indicated by the arrow C in FIG. 3(d)) and simultaneously the film holding apparatus movement driving means 29 starts to move the main roll 21 and the auxiliary roll 22 toward the upstream side (the direction indicated by the arrow A in FIG. 3(d)) while maintaining the relative position of the two rolls, i.e. maintaining the film 2's clinging state.

During this process, to avoid slippage between the film 2 and the surface of the main roll 21, it is preferable that the speed of the main roll rotation driving means 23 and that of the film holding apparatus movement driving means 29 is synchronized so that the circumferential speed of the main roll 21 will be equal to the moving speed of the film holding apparatus 20. In its movement, the film holding apparatus 20 is guided by the pair of pedestals travelling guides 25a and 25b. As a result of this movement of the film holding apparatus 20, the film (processed film) 2 in contact with the mold surface 3a is peeled off from the mold surface 3a as shown in FIG. 3(d).

(H) When the film 2 is peeled off completely to the upstream side edge of the mold 3, the main roll 21 stops rotating as shown in FIG. 3(e).

(I) Subsequently, the film 2 is released from the film fixation unit 54, and the film holding apparatus movement driving means 29 stops working, to prevent the film holding apparatus 20 from moving along the pair of pedestals travelling guides 25a and 25b as shown in FIG. 3(f). In this state, the main roll rotation driving means 23 starts to rotate the main roll 21 in the normal rotation direction (direction indicated by the arrow C) to supply a new predetermined length portion of the film processing film) 2 toward the downstream side. This supply of a new predetermined length portion of the film (processing film) 2 corresponds to the aforementioned intermittent supply of the film 2.

Here, it is preferable that the film 2 is free of slackening on the downstream side of the auxiliary roll 22 and that an appropriate tension is applied to the film 2 by the transportation driving roll 64 to prevent formation of creases. This intermittent film supply motion may be achieved by releasing the main roll 21 from the main roll rotation driving means 23 so that the main roll 21 is switched over from a driven state to an idling state, that is, the main roll 21 is in a free rotation state, followed by actuating the rotation of the transportation driving roll 64 located on the downstream side.

(J) Subsequently, film fixation unit 54 is actuated. In FIG. 3, the film fixation unit 54 and the film fixation unit 65 are indicated by a white rectangle when they are in an actuated state. Then, the main roll rotation driving means 23 starts to rotate the main roll 21 in the rotate in the reverse direction (the direction indicated by the arrow D in FIG. 3(*g*)), and the film holding apparatus movement driving means 29 simultaneously causes the main roll 21 and the auxiliary roll 22 to move toward the downstream side (the direction indicated by the arrow B in FIG. 3(*g*)), while maintaining the relative positions of the two rolls, that is, maintaining the film 2's clinging state, in order to supply a new predetermined length portion of the film (processing film) 2 over the mold surface 3*a*.

During this process, to avoid slippage between the film 2 and the surface of the main roll 21, it is preferable that the speed of the main roll rotation driving means 23 and that of the film holding apparatus movement driving means 29 is synchronized so that the circumferential speed of the main roll 21 will be equal to the moving speed of the film holding apparatus 20. During this process, to prevent an excessive tension from being applied to the film 2 on the upstream side of the upstream side edge of the mold 3, it is preferable that the tension applied to the film is adjusted by either of the unwind buffer 53 or any of the transportation rolls 52*b*, 52*c*, and 52*d* that has a tension adjustment function for the upstream side.

If an excessive tension is applied to the film, the film 2 will be more likely to receive a heat load at the edge of the mold 3. If receiving a heat load, the film can suffer a decrease in elastic modulus in the heated portion, leading a local stretching of in that portion of the film. This problem can be solved if an appropriate small clearance that depends on the thickness of the film 2 is maintained between the circumferential surface of the main roll 21 and the mold surface 3*a*.

(K) When supply of a new predetermined length portion of the film (processing film) 2 to the mold surface 3*a* has been completed, and the main roll 21 and the auxiliary roll 22 of the film holding apparatus 20 has reached a position on downstream side of the downstream side edge of the mold 3, the auxiliary roll revolution driving means 24 is actuated to revolve the auxiliary roll 22 to its original position (stand-by position 22P) as shown in FIG. 3(*h*). At this point, the film 2 is released from the clinging to the main roll 21 and the auxiliary roll 22, and as this released state is achieved, the film 2 is fixed by the film fixation unit 65.

During this process, to prevent an excessive tension from being applied to the film on the downstream side of the downstream side edge of the mold 3, it is preferable that the tension applied to the film is adjusted by any of the transportation driving roll 64, transportation rolls 62*a* and 62*b*, and wind up buffer 63 that has a tension adjustment function for the downstream side. The adjustment of this tension applied to the film can be achieved by controlling the timing of the revolving-descending motion of the auxiliary roll 22 and the motion of the film fixation unit 65. If an excessive tension is applied to the film, the film 2 will be more likely to receive a heat load at the edge of the mold 3. If receiving a heat load, the film can suffer a decrease in elastic modulus in the heated portion, leading a local stretching of in that portion of the film.

(L) As a new predetermined length portion of the film is supplied over the mold surface 3*a*, the film held in a U-shape in the box 55 in the unwind buffer unit 53 is pulled out toward the downstream side. This state of the pulled-out film is detected by the sensor 57*a*, and based on this detection, the unwind roll rotation driving means 51 is actuated to pull out the film 2 from the film roll 2Sa, and the film 2 is supplied to the box 55 in the unwind buffer unit 53.

This state of the film 2 supplied to the box 55 is detected by the sensor 57*b*, and based on this detection, the motion of the unwind roll rotation driving means 51 is stopped to stop the supply of the film from the film roll 2Sa to the box 55. On the other hand, the predetermined length portion of the processed film carrying a completed pattern, transported from the upstream side, is stored temporarily in a U-shape in the box 66 in the wind up buffer unit 63. This storage state is detected by the sensor 68*b*.

Then, the film is taken up by means of the motion of the wind-up roll rotation driving means 61, the take-up motion continuing until the film 2 is no more detected by the sensor 68*a*, that is, the same length of the film as the portion newly stored is taken up, to form the processed film roll 2Fa.

(M) As preparations for processing of the next portion of the processing film, the upper heat regulation plate 15*a* and the lower heat regulation plate 15*b* start to be heated when, immediately before, the peeling of the film from the mold surface 3*a* is completed. The film pressing apparatus 10 is actuated and the upper heat regulation plate 15*a* is brought down close to the surface of the film 2. When the preparations are completed, the actions in and after the step (C) are repeated.

The actions in the steps (F) to (H) allow smooth film peeling from the mold surface 3*a* to be incorporated in the intermittent film processing cycle, making it possible to produce processed film free of significant peeling flaws.

The action in the step (I) allows smooth film supply to be incorporated in the intermittent film processing cycle, making it possible to produce processed film free of significant creases formed during transportation.

The action in the step (J) allows the film to be supplied smoothly over the mold surface to achieve crease-free film supply over the mold surface. In this step (J), the film supplied from the downstream side to the mold surface does not suffer tension to be used for peeling, and the film crease formation prevention for the film supplied to the mold surface is performed in a state free of tension that can cause creases in the film, making it possible to produce a processed film that is free of serious undulation after the processing steps.

The processing cycle that incorporates a series of film peeling actions and film supply actions in the steps (C) to (M) serves to allow the film for processing in the next cycle to be supplied quickly to the film pressing apparatus, to provide an intermittent processed film production method with a high productivity.

Figure 4:
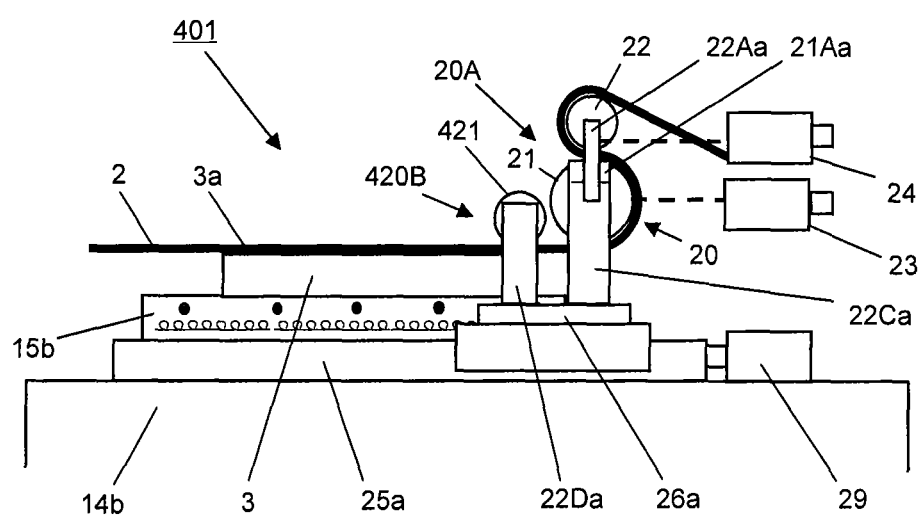
FIG. 4 schematically shows part of a side face of another example of the film production apparatus of the invention.
Figure 5:
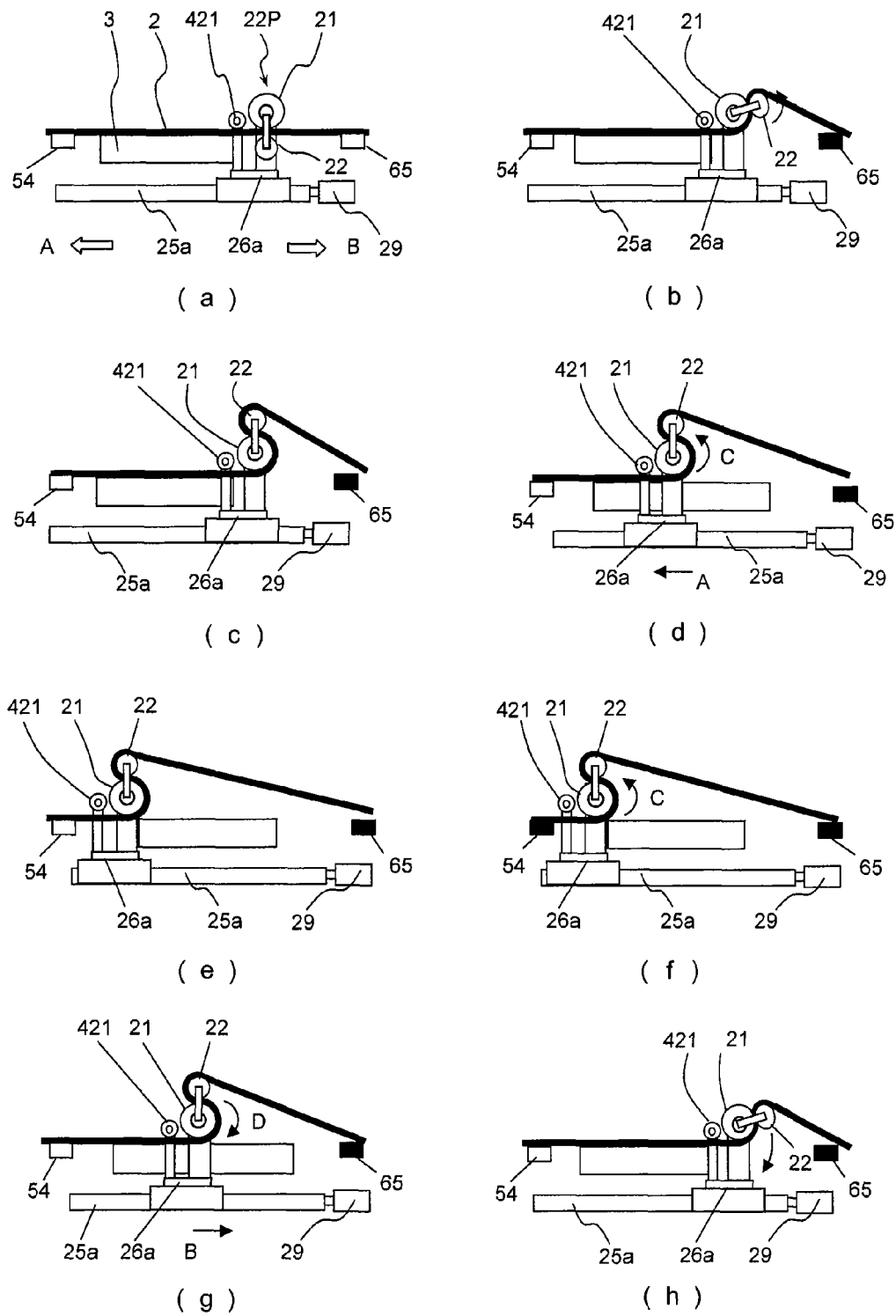
FIG. 5 shows the workings of major functional components in the second illustrative embodiment of the film production method of the invention that comprises the apparatuses given in FIG. 4. The diagrams (a) to (h) in FIG. 5 illustrate time-series change of the workings.
Figure 6:
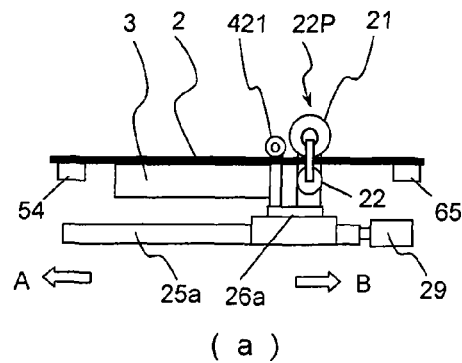
FIG. 6 shows the workings of major functional components in the third illustrative embodiment of the film production method of the invention that comprises the apparatuses given in FIG. 4. The diagrams (a) to (g) in FIG. 6 illustrate time-series change of the workings.
Figure 6:
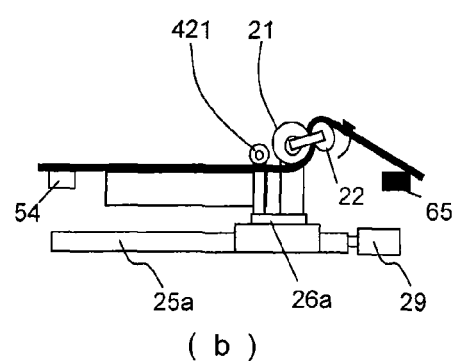
Figure 6:
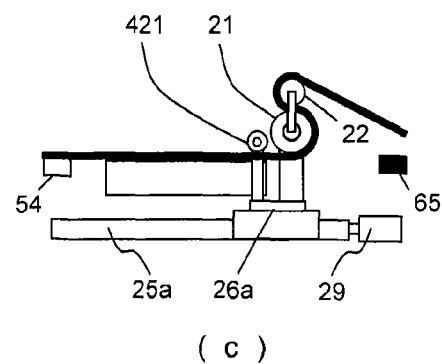
Figure 6:
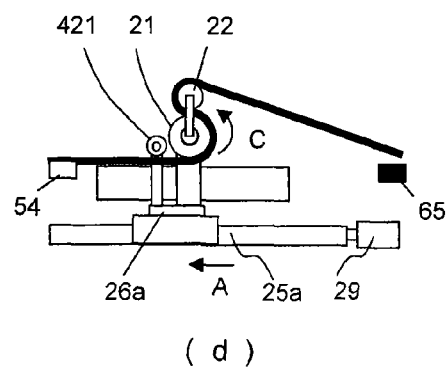
Figure 6:
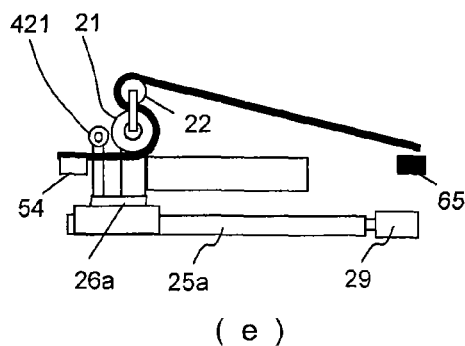
Figure 6:
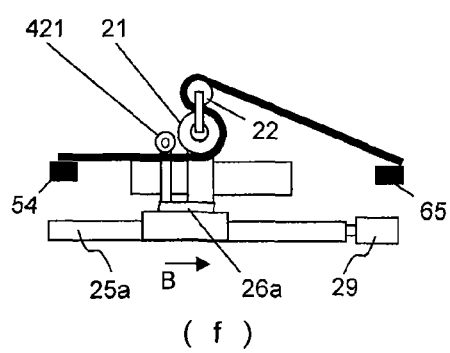
Figure 6:
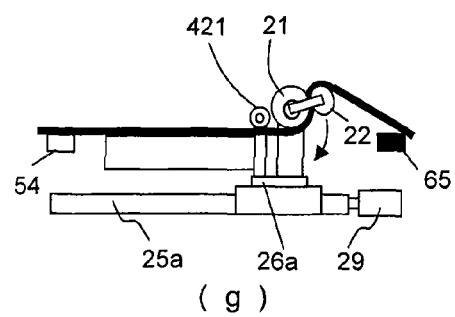

FIG. 4 shows a schematic side view of a part of an example of the second illustrative embodiment of the film production apparatus of the invention. FIG. 5 shows the workings of major functional components in the second illustrative embodiment of the film production method of the invention which is performed with the apparatuses shown in FIG. 4, and the diagrams (a) to (h) in FIG. 5 illustrate time-series change in the actuation state. FIG. 6 shows the workings of major functional components in the third illustrative embodiment of the film production method of the invention which is performed with the apparatuses shown in FIG. 4, and the diagrams (a) to (g) in FIG. 6 illustrate time-series change in the actuation state.

FIG. 4 shows a film production apparatus 401 according to one embodiment of the invention. The film production apparatus 401 differs from the film production apparatus 1 given in FIG. 1 only in the portion illustrating the crease formation prevention apparatus. Thus, the description here focuses mainly on the structure and motion of the crease formation prevention apparatus in the film production apparatus 401. Accordingly, the device elements of the film production apparatus 401 shown in FIG. 4 that are common to the apparatus shown in the film production apparatus 1 are illustrated with the same symbols as for the device elements of the film production apparatus 1.

The film production apparatus 401 has the same apparatus as the film peeling apparatus 20A in the film production apparatus 1. Specifically, the film production apparatus 401 has the film holding apparatus 20 that contains the main roll 21 and the auxiliary roll 22. The main roll 21 and the auxiliary roll 22 are fixed to the pair of pedestals 26a and 26b by means of the pair of main roll support arms 21Aa and 21Ab and the pair of auxiliary roll support arms 22Ca and 22Cb, respectively. The pair of pedestals 26a and 26b can move along the pair of pedestals travelling guides 25a and 25b. In addition, the film holding apparatus movement driving means 29 is provided, as needed, to positively move the pair of pedestals 26a and 26b along the pair of pedestals travelling guides 25a and 25b.

In addition to the main roll 21, the film production apparatus 401 is provided with a crease-smoothing roll 421 that is located with space from, and in parallel to, the main roll 21 on the upstream side of the main roll 21 and in contact with the opposite surface of the film 2 to the surface on which a pattern is formed. The ends of the crease-smoothing roll 421 are supported on a pair of crease-smoothing roll support arms 22Da and 22Db in a rotatable manner. The lower ends of the pair of crease-smoothing roll support arms 22Da and 22Db are fixed on the pair of pedestals 26a and 26b. Accordingly, the crease-smoothing roll 421 can move in the length direction of the film 2 as the pedestals 26a and 26b move. These components thus constitute a crease formation prevention apparatus 420B in the film production apparatus 401.

In the film production apparatus 1, the main roll 21 serves for prevention of crease formation during film supply to the mold surface, in addition to peeling of the film from the mold surface and supply of the film to the mold surface, as described above. In the film production apparatus 401, on the other hand, peeling of the film from the mold surface and supply of the film to the mold surface are performed by the main roll 21, but prevention of crease formation during film supply to the mold surface is implemented by the crease-smoothing roll 421 provided separately from the main roll 21.

For the peeling of the film 2 from the mold surface 3a in the film production apparatus 401, the main roll rotation driving means 23 works to drive the film holding apparatus movement driving means 29 while maintaining a constant torque, so that the film 2 is peeled off from the mold surface 3a as the film peeling apparatus 20A moves toward the upstream side. If a sufficiently high frictional force exists between the surface of the film 2 and the circumferential surface of the main roll 21, only the combination of the frictional force and the tension applied to the film 2 can sufficiently move the film holding apparatus 20 along the pair of pedestals travelling guides 25a and 25b. In this case, it is not necessary for the film holding apparatus movement driving means 29 to positively move the pair of pedestals 26a and 26b.

It is preferable that at least that part of the circumferential surface of the crease-smoothing roll 421 that comes in contact with the film 2 is formed of foam sponge composed mainly of silicone resin or fluorine resin so that the fine asperity pattern on the mold surface 3a will not be damaged even when the film 2 comes in contact with or pressed against the mold surface 3a during its supply, and also that the surface of the crease-smoothing roll 421 will not be degraded under the influence of the mold surface 3a heated at high temperature. High crease-smoothing effect can be obtained as the crease-smoothing roll 421, during its movement, works to bring the film 2 in contact with, or press it against, the mold surface 3a.

The circumferential surface of the crease-smoothing roll 421 may be formed of metal, resin, or rubber. Preferable resins and rubbers include fluorine resin, ethylene-propylene-diene rubber (EPDM), silicone rubber, and fluorine rubber, and it is preferable to use materials that are free of thermal degradation when coming in contact with or close to a high temperature mold surface. It is also preferable that the circumferential surface of the crease-smoothing roll 421 is subjected to slippage improving treatment so that the film 2 will not be brought into strong contact with the circumferential surface crease-smoothing roll 421. Such slippage improving treatment is achieved preferably by, for instance, increasing the surface roughness of the circumferential surface or surface coating with diamond-like carbon. If the surface roughness is to be increased, it is preferable that the center line average roughness (JIS B0601) of the circumferential surface of the crease-smoothing roll 421 adjusted to $1.0\,\mu m$ to $100\,\mu m$ in order to achieve appropriate slippage properties.

In cases where the film is extremely thin and to be processed on a mold surface having an extremely fine asperity pattern so that the mold surface is likely to be damaged by the crease-smoothing roll when it comes in contact with the mold surface, it is preferable that the distance (clearance) H between the circumferential surface of the crease-smoothing roll and the mold surface is adjusted to 0.1 mm to 5 mm. It is more preferably in the range of 0.1 mm to 1 mm. The distance (clearance) H between the circumferential surface of the crease-smoothing roll and the mold surface is illustrated by replacing the main roll with the crease-smoothing roll in FIG. 2 which shows the distance (clearance) H between the circumferential surface of the main roll and the mold surface.

The crease-smoothing roll will not have a sufficient crease-smoothing effect, if this clearance H exceeds 5 mm. If the clearance H is less than 0.1 mm, the mold surface is likely to come in contact with the crease-smoothing roll, and the fine asperity pattern on the mold surface is likely to be damaged if such contact takes place. The parallelism between the crease-smoothing roll and the mold surface is preferably 0.5 mm or less, more preferably 0.1 mm or less.

The circumferential surface of the crease-smoothing roll 421 is preferably formed of rubber having a certain degree of elasticity and tackiness. In that case, the rubber preferably has a rubber hardness (JIS K6253) in the range of 40 to 70, more preferably 50 to 60. The center line average roughness (JIS B0601) of the circumferential surface of the crease-smoothing roll 421 is preferably $0.01\,\mu m$ to $1.0\,\mu m$. It is more preferably $0.01\,\mu m$ to $0.5\,\mu m$. Preferable rubbers include ethylene-propylene-diene rubber (EPDM), silicone rubber, and fluorine rubber.

Good contact will not be made between the film 2 and the crease-smoothing roll 421 if the rubber hardness is more than 70 or the center line average roughness is more than $1.0\,\mu m$. In that case, slippage can takes place between the film 2 and the crease-smoothing roll 421 during the crease formation prevention step, and the tension on the film 2 will decrease, leading to a reduction in the crease formation prevention effect. If the rubber hardness is less than 40, the rubber will suffer a larger deformation during the crease formation prevention step, making the crease formation prevention motion unstable. In that flaws may be caused by the crease-smoothing treatment on a surface of the film. It will be difficult to produce a crease-smoothing roll having a center line average roughness of less than $0.01\,\mu m$.

Next, the second illustrative embodiment of the film production method of the invention is described with reference to the film production apparatus 401 shown in FIG. 4.

In the second illustrative embodiment of the film production method of the invention, the peeling of the film 2 from the mold surface 3a is achieved by allowing the main roll 21 to move in the vicinity of the mold surface 3a and in parallel to the mold surface 3a from the downstream side to the upstream side, while the main roll 21 and the auxiliary roll 22 are kept rotating with the film 2 held on the rolls. The motion of peel off the film 2 from the mold surface 3a is as described for the first illustrative embodiment of the film production method of the invention.

Then, the film 2 is transported with both rolls kept rotating but unmoved in the length direction. This transportation of this film is performed as described for the first illustrative embodiment of the film production method of the invention.

Then, the film 2 is supplied over the mold surface 3a, and at the same time the crease formation prevention for the film being supplied is carried out as the rotating crease-smoothing roll 421 moves over the mold surface 3a from the upstream side to the downstream side. This crease formation prevention is achieved by the movement of the main roll 21, as described above, in the first illustrative embodiment of the film production method of the invention, whereas it is achieved by the movement of the crease-smoothing roll 421 in the case of the second illustrative embodiment of the film production method of the invention. The two illustrative embodiments differ in this point.

Major actions in the second illustrative embodiment of the film production method of the invention are described below with reference to FIG. 4 and FIG. 5.

Before the peeling of the film 2 from the mold surface 3a, the film holding apparatus 20 stays at a stand-by position 22p as shown in FIG. 5(*a*). In FIG. 5, the arrow A indicates the upstream side (film unwinding side) while the arrow B indicates the downstream side (film winding-up side). To start the peeling motion, the auxiliary roll revolution driving means 24 is actuated to move the auxiliary roll 22 to a position nearly directly above the main roll 21 as shown in FIGS. 5(*b*) and (*c*).

Subsequently, while the main roll rotation driving means 23 keeps the main roll 21 rotating in the normal rotation direction (the direction indicated by the arrow C), the film holding apparatus movement driving means 29 moves the film holding apparatus 20 toward the upstream side (the direction indicated by the arrow A) as shown in FIG. 5(*d*). The main roll 21, which is rotating in the normal rotation direction (the direction indicated by the arrow C), moves toward the upstream side along the mold surface 3a. As it moves, the film 2 adhered to the mold surface 3a is peeled off continuously, with the main roll 21 holding the film 2.

When the peeling of the film 2 has been completed over the entire area of the mold surface 3a as shown in FIG. 5(*e*), the main roll 21 will no more move toward the upstream side or the downstream side as shown in FIG. 5(*f*). Thus, to keep the film holding apparatus 20 still, the film holding means movement driving means 29 is actuated to stop the movement of the film holding apparatus 20. In this state, the main roll rotation driving means 23 starts rotating the main roll 21 in the normal rotation direction (the direction indicated by the arrow C) to deliver the film 2 toward the downstream side.

During this delivery of the film, it is preferable that the transportation driving roll 64 provided on the downstream side rotates to apply tension to the film 2. This applied tension prevents slackening of the film 2 moving toward the mold surface 3a and at the same time prevents crease formation in the film 2 which is otherwise likely to take place during its transportation.

On the other hand, a delivery of the film 2 in a length for an intermittent feed toward the downstream side can also be carried out by operating the main roll rotation driving means 23 to keep the main roll 21 in a freely rotatable state while keep the transportation driving roll 64 rotating.

Then, the main roll rotation driving means 23 is actuated to rotate the main roll 21 in the rotate in the reverse direction (the direction indicated by the arrow D) as shown in FIG. 5(*g*) so that the intermittent predetermined length portion previously moved forward is moved back like supplying the film 2 to the mold surface 3a, while the film holding apparatus movement driving means 29 is actuated to move the film holding apparatus 20 toward the downstream side (the direction indicated by the arrow B). Actuated by this movement, the crease-smoothing roll 421, which is fixed on the same pedestals 26a and 26b as the film holding apparatus 20, starts to move, while rotating, along the surface of the film 2 toward the downstream side, in coordination with the movement of the main roll 20.

During this step, the main roll 21 and crease-smoothing roll 421 may be in contact with the surface opposite to the mold-side surface of the film that is in contact with the mold surface, or apart from the surface with a small clearance in between.

Then, as shown in FIG. 5(*h*), when the supply of the film 2 to the mold surface 3a has been completed and the film holding apparatus 20 has reached the downstream end of its movement range, the auxiliary roll revolution driving means 24 actuates revolving-descending motion of the auxiliary roll 22 down to a position nearly directly below the main roll 21 in order to release the film 2 from the gripping by the main roll 21 and the auxiliary roll 22.

During the peeling of the film from the mold surface and the supply of the film to the mold surface, it is preferable that the main roll rotation driving means 23 and the film holding apparatus movement driving means 29 are synchronized in their motion and the degree of their motion so that the circumferential speed of the main roll 21 will become equal to the moving speed of the film holding apparatus 20, thus preventing slippage from taking place between the surface of the main roll 21 and the film 2.

During the peeling of the film from the mold surface and the supply of the film to the mold surface, the crease-smoothing roll 421 may be in contact with the surface opposite to the mold-side surface of the film that is in contact with the mold surface. If the crease formation prevention motion is performed with the crease-smoothing roll in contact with the surface of the film located on the mold surface as in the above case, it is preferable that the pressing force applied by the crease-smoothing roll to press the film against the mold surface is controllable. For instance, it is preferable that a crease-smoothing roll pressure adjustment means, such as air cylinder, spring or other elastic members, is provided at both ends of the roll axis of the crease-smoothing roll to control the pressing force applied by the crease-smoothing roll in the direction toward the mold surface. The crease-smoothing effect can be enhanced by allowing the crease-smoothing roll to come in contact with, and apply an appropriate pressing force to, the surface of the film located on the mold surface.

The third illustrative embodiment of the film production method of the invention is described below with reference to the film production apparatus 401 shown in FIG. 4. Both the second illustrative embodiment of the film production method of the invention and the third illustrative embodiment of the film production method of the invention can be implemented using the film production apparatus 401 shown in FIG. 4, but some device elements of the film production apparatus 401 work in different ways in the two illustrative embodiments. These different points are described below.

In the third illustrative embodiment of the film production method of the invention, the peeling of the film 2 from the mold surface 3a is achieved by allowing the main roll 21 to move in the vicinity of the mold surface 3a and in parallel to the mold surface 3a from the downstream side to the upstream side, while the main roll 21 and the auxiliary roll 22 are kept rotating with the film 2 held on the rolls. The motion of peel off the film 2 from the mold surface 3a is as described for the second illustrative embodiment of the film production method of the invention.

Then, supply of the film 2 to the mold surface is achieved by allowing the main roll 21 to move in the vicinity of the mold surface 3a and in parallel to the mold surface 3a from the upstream side to the downstream side, while both rolls are prevented from rotating, with the film 2 held on these rolls. Specifically, the supply of the film 2 to the mold surface 3a is by the film holding apparatus 20 moving from the upstream side to the downstream side while the main roll 21 and the auxiliary roll 22 are prevented from rotating.

This supply of the film 2 to the mold surface 3a is carried out in a different manner from that in the case of the second illustrative embodiment of the film production method of the invention. In the second illustrative embodiment of the film production method of the invention, both rolls rotate to temporarily store an intermittent predetermined length portion of the film 2 in the space above the mold 3, and then the temporarily stored portion of the film 2 is moved over the mold surface 3a as the rolls rotate in the opposite direction, thus carrying out the supply step. The third illustrative embodiment of the film production method of the invention, on the other hand, does not contain the step for preliminary delivery of the film 2, and the film 2 is supplied directly over the mold surface 3a as the two rolls move over the mold surface 3a under rotations of both rolls being prevented.

The crease formation prevention step for the film 2 supplied to the mold surface 3a is carried out by the crease-smoothing roll 421 that rotates as it moves over the mold surface 3a, while the film 2 is being supplied. This crease formation prevention by the crease-smoothing roll 421 is performed through the same action as in the second illustrative embodiment of the film production method of the invention.

Major steps in the third illustrative embodiment of the film production method of the invention are described below with reference to FIGS. 4 and 6.

The steps given in FIGS. 6(a) to (e) are the same as those illustrated above in FIGS. 5(a) to (e), and therefore, they are not included in the following description.

FIG. 6(f) shows a state in which the film fixation unit 54 on the upstream side has been released while the main roll 21 is prevented from rotating. In this state, with the film 2 held on the main roll 21 and the auxiliary roll 22, the two rolls, hence the film holding apparatus 20, is moved toward the downstream side by the film holding apparatus movement driving means 29, so that an intermittent predetermined length delivery portion of the film 2 is taken out from the unwind buffer unit 53, and the film 2 thus taken out is supplied over the mold surface 3a. In coordination with this supply of the film 2 over the mold surface 3a, the crease-smoothing roll 421 moves, while rotating, over the mold surface 3a, thus achieving crease formation prevention.

It is preferable that during this step, the transportation driving roll 64 located on the downstream side rotates to apply tension to the film 2. This applied tension prevents slackening of the film 2 moving toward the mold surface 3a and at the same time prevents crease formation in the film 2 which is otherwise likely to take place during its transportation.

Then, as shown in FIG. 6(g), when the supply of the film 2 to the mold surface 3a has been completed and the film holding apparatus 20 has reached the downstream end of its movement range, the auxiliary roll revolution driving means 24 actuates revolving-descending motion of the auxiliary roll 22 down to a position nearly directly below the main roll 21 in order to release the film 2 from the gripping by the main roll 21 and the auxiliary roll 22.

Figure 7:
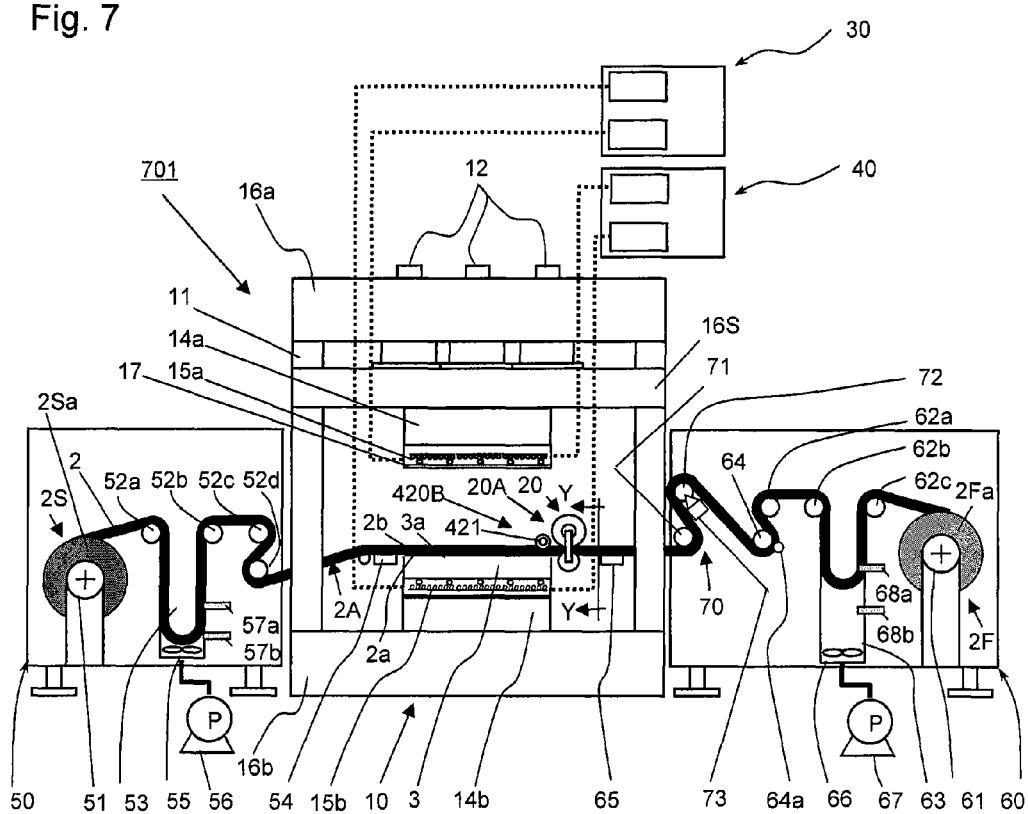
FIG. 7 shows a schematic side view of still another example of the film production apparatus of the invention.
Figure 8:
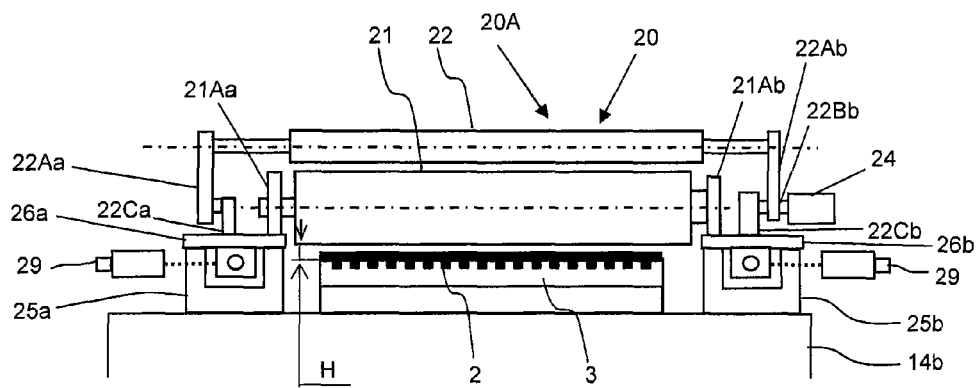
FIG. 8 shows the Y-Y cross section indicated by arrows in FIG. 7.
Figure 9:
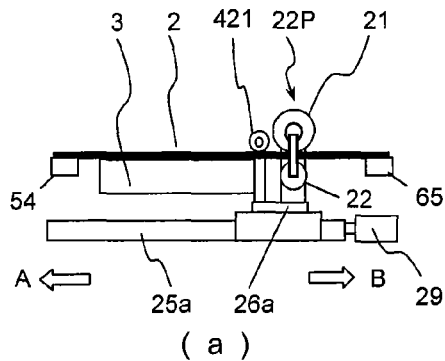
FIG. 9 shows the workings of major functional components in the third illustrative embodiment of the film production method of the invention that comprises the apparatuses given in FIG. 7. The diagrams (a) to (h) in FIG. 9 illustrate time-series change of the workings.
Figure 9:
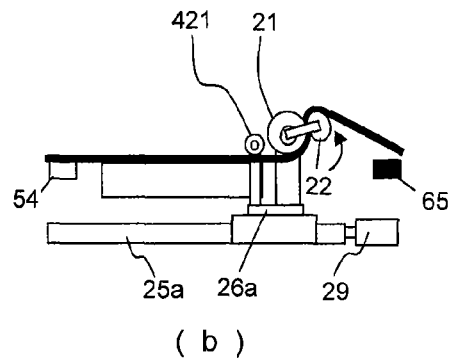
Figure 9:
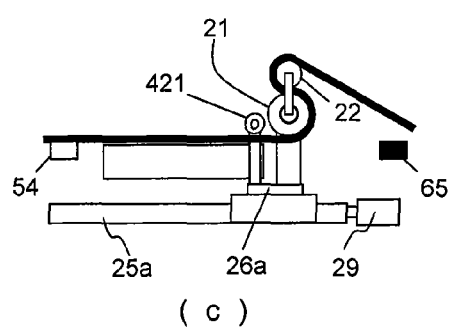
Figure 9:
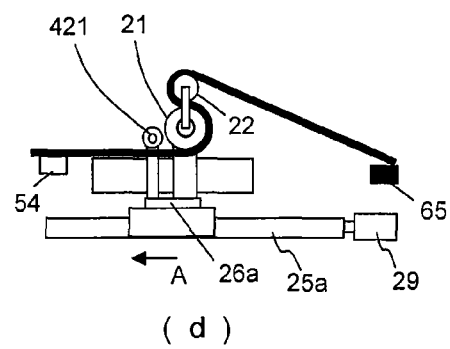
Figure 9:
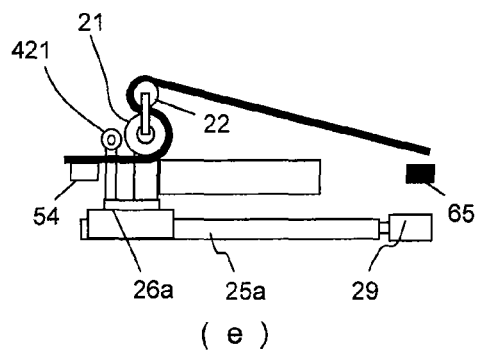
Figure 9:
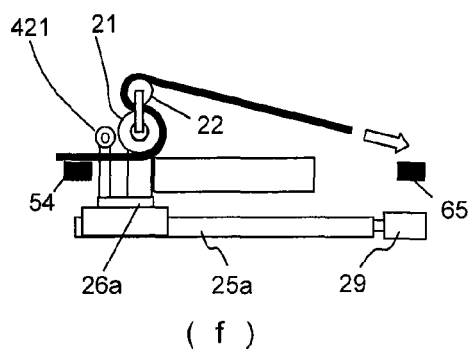
Figure 9:
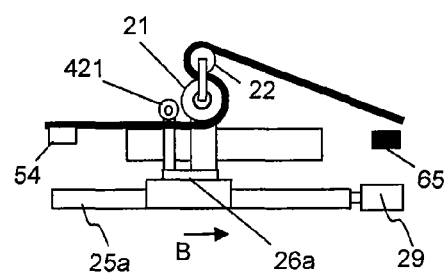
Figure 9:
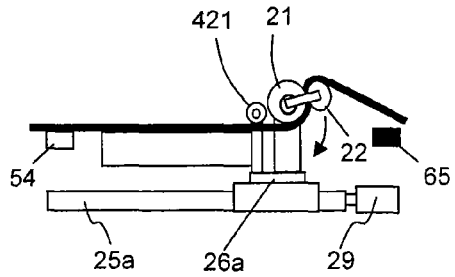

FIG. 7 shows a schematic side view of an example of the third illustrative embodiment of the film production apparatus of the invention. FIG. 8 shows the Y-Y cross section indicated by arrows in FIG. 7. FIG. 9 shows the workings of major functional components in the second illustrative embodiment of the film production method of the invention that comprises the apparatus given in FIG. 7. The diagrams (a) to (h) in FIG. 9 illustrate time-series change of the workings. On the other hand, the third illustrative embodiment of the film production method of the invention can also be implemented using an apparatus that is essentially the same as in FIG. 7 but with some device elements working in a different manner.

FIG. 7 shows a film production apparatus 701 according to an embodiment of the invention. Whereas in the film production apparatus 401 shown in FIG. 4, the main roll 21 is provided with the main roll rotation driving means 2, the main roll 21 is not provided with a main roll rotation driving means in the film production apparatus 701 which does have a main roll 21. The film production apparatus 701, furthermore, contains a film tension adjustment means for adjustment of tension on the film in the film transportation path 2A between the mold 3 and the transportation driving roll 64 located on the downstream side of the mold 3. However, the film production apparatus 401 does not have such a film tension adjustment means.

The film production apparatus 701 and the film production apparatus 401 differ in these points. Other device elements are commonly included in the film production apparatus 701 and the film production apparatus 401. Accordingly, the device elements shown in FIG. 7 that are common to FIGS. 1, 2, and 4 are illustrated with the same symbols. The device elements commonly included in these apparatuses have already been described and therefore, are not included in the description below.

In FIG. 8, the main roll 21 given in the film production apparatus 701 is not provided with such a main roll rotation driving means 23 as shown in FIG. 4 in which it is connected to the main roll 21. In FIG. 8, the ends of the main roll 21 are supported on the pair main roll support arms 21Aa and 21Ab in a rotatable manner. Specifically, the main roll 21 is supported on the pair of main roll support arms 21Aa and 21Ab in such a manner that it can be rotated when coming in contact with a moving object (for instance, traveling film).

A film tension adjustment means 70 to apply an appropriate tension to the film 2 is provided on the downstream side of the main roll 21 in the film transportation direction. As shown in FIG. 7, the film tension adjustment means 70 comprises, for instance, a guide roll 71, tension detection roll 72, transportation driving roll 64, and a tension detection means 73 that detects tension based on sensing by the tension detection roll 72, which are installed from upstream side toward the downstream side along the film transportation path 2A. Based on the tension on the film detected by the film tension detection means 73, the driving force of the transportation driving roll 64 is adjusted, and the degree of the tension applied to the film by the tension adjustment means 70 is controlled.

By using the film production apparatus 701, both the second illustrative embodiment of the film production method of the invention and the third illustrative embodiment of the film production method of the invention can be implemented in the same manner as with the film production apparatus 401. Described below is the use of the film production apparatus 701 to implement the second illustrative embodiment of the film production method of the invention.

Before the peeling of the film 2 from the mold surface 3a, the main roll 21 and the auxiliary roll 22 stay at the stand-by position 22p as shown in FIG. 9(a). Thus, the film holding apparatus 20 stands by while the main roll 21 and the auxiliary roll 22 stay at the stand-by position 22p. In FIG. 9, the arrow A indicates the upstream side while the arrow B indicates the downstream side. To start the peeling of the film 2 from the mold surface 3a, the auxiliary roll revolution driving means 24 is actuated to move the auxiliary roll 22 to a position nearly directly above the main roll 21 as shown in FIGS. 9(b) and (c). Subsequently, the film holding apparatus movement driving means 29 is actuated to move the film holding apparatus 20 toward the upstream side as shown in FIG. 9(d). That is, the main roll 21 moves toward the upstream side. At the same time, the transportation driving roll 64 located on the downstream side is actuated to apply tension to the film 2. While moving toward the upstream side, the main roll 21 rotates along the film 2 formed a pattern on the mold surface 3a in order to peel off the film 2 from the mold surface 3a from the downstream side toward the upstream side.

When the peeling of the film 2 has been completed over the entire area of the mold surface 3a as shown in FIG. 9(e), the film fixation unit 54 located on the upstream side is released as shown in FIG. 9(f). In this state, to prevent the main roll 21 from moving toward the upstream side or the downstream side, that is, to prevent the film holding apparatus 20 from moving along the pair of pedestals travelling guides 25a and 25b, the film holding apparatus movement driving means 29 is actuated to keep the film holding apparatus 20 still. In this state, the film 2 held on the main roll 21 being in freely rotatable and the auxiliary roll 22 being in freely rotatable is taken out with a length of intermittent feed by the transportation driving roll 64. In this step, as the film 2 moves, the main roll 21 and the auxiliary roll 22 are caused to rotate due to the friction between the film and the rolls.

Then, as shown in FIG. 9(g), the film fixation unit 54 located on the upstream side is actuated, i.e. closed, and the film holding apparatus movement driving means 29 is actuated to move the main roll 21 toward the downstream side. At the same time, the transportation driving roll 64 is actuated to apply an appropriate tension to the film 2, and the film 2 is supplied over the mold surface 3a. In this state, too, the freely rotatable main roll 21 and the freely rotatable auxiliary roll 22 are caused to rotate due to the friction between the film 2 and the rolls. The crease-smoothing roll 421 simultaneously moves, while rotating, along the film 2 in order to prevent the formation of creases in the film 2 being supplied over the mold surface 3a.

Then, as shown in FIG. 9(h), when the supply of the film 2 to the mold surface 3a has been completed and the film holding apparatus 20 has reached the downstream end of its movement range, the auxiliary roll revolution driving means 24 actuates descending motion of the auxiliary roll 22 down to a position nearly directly below the main roll 21 in order to release the film 2 from the gripping by the two rolls.

It is preferable that the film used to form a fine asperity pattern on its surface by the film production method and apparatus of the invention is composed of a thermoplastic resin as main component. Its glass transition temperature Tg is preferably in the range of 40° C. to 180° C. It is more preferably in the range of 50° C. to 160° C., still more preferably 50° C. to 120° C.

If the glass transition temperature Tg is less than 40° C., the resulting moldings will be likely to have a decreased heat resistance and suffer deformation over time. The processing temperature has to be increased if the glass transition temperature Tg exceeds 180° C. A high processing temperature will lead to a decrease in energy efficiency. In addition, the film will be likely to suffer large deformation during heating or cooling, or get caught in the mold surface, making its peeling difficult. Even if peeled, the film can suffer a decrease in the pattern transfer accuracy or a partial loss of the pattern, leading to defects.

The preferable film materials used as the main component of the thermoplastic resin include, for instance, the following: polyester resins such as polyethylene terephthalate, polyethylene-2,6-naphthalate, polypropylene terephthalate, and polybutylene terephthalate; polyolefin resins such as polyethylene, polystyrene, polypropylene, polyisobutylene, polybutene, and polymethylpentene; and others such as polyamide resin, polyimide resin, polyether resin, polyester amide resin, polyether ester resin, acrylic resin, polyurethane resin, polycarbonate resin, and polyvinyl chloride resin.

Of these, polyester resin, polyolefin resin, polyamide resin, acrylic resin, and their mixtures are preferable because many types of copolymerizable monomers are available and as a result, physical properties of the materials can be adjusted easily. The film used preferably contains the thermoplastic resin up to 50 wt % or more.

The original film, or the film for processing (processing film), to be patterned by the film production method and production apparatus according to embodiments of the invention may be either a monolayer film of a resin included in the above list or a laminated film composed of two or more resin layers. Compared with monolayer films, laminated films can be processed easily to develop surface characteristics such as lubricity and friction resistance, mechanical characteristics such as strength, and thermal characteristics such as heat resistance. In the case of the laminated films, it is preferable that entire film meets the requirements. Even if the requirements are not met across the entire film, a desired pattern will be formed easily on its surface if at least the surface layer meets the requirements.

The film for processing (processing film) preferably has a thickness (film thickness) in the range of 0.01 mm to 1 mm. A thickness of less than 0.01 mm will be insufficient to perform the processing, whereas if the thickness exceeds 1 mm, the film will be so high in rigidity that it will be difficult to transport the film in the production apparatus.

The film for processing (processing film) may contain, for instance, organic fine particles, inorganic fine particles, dispersing agent, dye, fluorescent brightening agent, antioxidant, weathering agent, antistatic agent, mold releasing agent, viscosity improver, plasticizer, pH adjustor, and salts. In particular, as a mold releasing agent to improve the peeling properties of the mold surface, the film for processing (processing film) preferably contain small amounts of low-surface-tension carboxylic acids such as long chain carboxylic acid and long chain carboxylate, and derivatives thereof; long chain alcohols and derivatives thereof; and low-surface-tension alcohol compounds such as modified silicone oil.

It is preferable that the surface of the film for processing (processing film) to be patterned is laminated with a mold release layer. If the outermost surface of the film for processing (processing film), or the surface to come in contact with the mold surface, is provided with a mold release layer before the start of processing, it will be possible to improve the durability (number of repeated use cycles) of the mold release coat over the mold surface. Even if the mold used suffer a partial loss of the mold release effect, the peeling of the film from the mold surface can be performed uniformly if a mold release layer exists on the film. Even if the mold used has not received any mold release treatment, the peeling of the film from the mold surface can be performed smoothly if a mold release layer exists on the film. In this case, the cost for mold release treatment can be reduced.

If the film has a mold release layer, it serves to prevent the destruction of the pattern from being caused by sticking resin when the film is peeled from the mold surface. It also serves to perform the peeling of the film at higher temperatures, leading to a shorter cycle time. Furthermore, the slippage properties of the film surface, hence the scratch resistance, will be improved, leading to decreased defects caused in the manufacturing process etc.

In cases where both outermost layers of the film for processing (processing film) are to be patterned, a mold release layer may be provided on either of the surfaces to be patterned, or a mold release layer may be provided on both outermost layers.

There are no limitations on the resin that constitutes the mold release layer, it preferably comprises, as the primary component, silicone resin, fluorine resin, fatty acid resin, polyester resin, olefin resin, or melamine resin. Of these, silicone resin, fluorine resin, and fatty acid resin are particularly preferable. In addition to the resins, the mold release layer may also contain, for instance, acrylic resin, urethane resin, epoxy resin, urea resin, and phenol resin. The mold release layer may also contain various additives including, for instance, antistatic agent, surface active agent, antioxidant, heat resistant stabilizer, weathering stabilizer, ultraviolet absorber, pigment, dye, organic or inorganic fine particles, filler, nucleating agent, and cross-linked agent. There are no specific limitations on the thickness of the mold release layer, but it is preferably in the range of 0.01 µm to 5 µm. The releasability improving effect can be reduced if the thickness of the mold release layer is less than 0.01 µm.

There are no specific limitations on the method to be used to form a mold release layer on the surface of the film for processing (processing film), and there are various useful coating methods including, for instance, reverse coating, gravure coating, rod coating, bar coating, die coating, and spray coating. In view of productivity and coating uniformity, it is preferable that the formation of the mold release layer is carried out through in-line coating as part of the production of the film for processing (processing film).

EXAMPLES

Example 1

The film production apparatus 1 shown in FIG. 1 was used to produce a film having a fine asperity pattern.

(1) The mold 3 used:

Size of the mold 3: 500 mm (in the width direction of the film 2)×800 mm (in the traveling direction of the film 2)×20 mm (thickness).

Material of the mold 3: copper

The fine asperity pattern formed on the mold surface 3a: many stripes arranged in the length direction the mold surface 3a with intervals in the width direction of the mold surface 3a. Each stripe has a right triangular cross section. The right triangle has a height of 10 µm and a base length of 5 µm. The bases of adjacent right triangles are located adjacent to each other.

(2) The film pressing apparatus 10 used:

An oil hydraulic pressure pump having a maximum pressure load of 3,000 kN. Both the upper heat regulation plate 15a and the lower heat regulation plate 15b are made of an aluminum alloy with a size of 700 mm (in the width direction of the film 2)×1,000 mm (in the traveling direction of the film 2). Each heat regulation plate is connected to the heating unit 30 and the cooling unit 40. The heating unit 30 is of a heating medium circulation type. The heating medium is Barrel Therm No. 400 (supplied by Matsumura Oil Co., Ltd.). The temperature of the heating medium is 150° C., its flow rate is 100 liters/min. The cooling unit 40 is of a cooling water circulation type. The temperature of the cooling water is 20° C., and its flow rate is 150 liters/min.

(3) The film holding apparatus 20 used:

A combination of the main roll 21 and the auxiliary roll 22. The main roll 21 has an outside diameter of 150 mm. Its outermost layer is made of silicone rubber having a rubber hardness of 60 (JIS K6253), and the surface has a center line average roughness of 0.5 µm (JIS B0601). The main roll rotation driving means 23 comprises a combination of a servomotor and a servo-amplifier that can switch over the rotation direction of the main roll 21. The auxiliary roll 22 has an outside diameter of 50 mm. Its outermost layer is made of fluorine resin. The distance (clearance H) between the main roll 21 and the mold surface 3a is 0.5 mm. The film holding apparatus movement driving means 29 for moving to and fro the film holding apparatus 20 including the main roll 21 and the auxiliary roll 22 over the mold surface 3a comprises a servomotor.

(4) The film 2 used:

The film 2 is made of polyethylene terephthalate. The film 2 has a thickness of 38 µm (thickness unevenness: ±3 µm) and a width of 520 mm. The film 2 is delivered from the film take-out apparatus 50 installed on the upstream side of the film pressing apparatus 10, and wound up by the film take-up apparatus 60 installed on the downstream side of the film pressing apparatus 10.

(5) Actuation of major device elements used in the film production apparatus 1:

First, the film 2 was passed through the film transportation path 2A from the film take-out apparatus 50 to the film take-up apparatus 60 via the film pressing apparatus 10. Then, both the upper heat regulation plate 15a and the lower heat regulation plate 15b were heated up to a temperature of 120° C., and the upper heat regulation plate 15a was lowered to start pressing of the film 2. The pressing was implemented with a pressure of 5 MPa at the mold surface 3a and a press time of 30 sec. Subsequently, under continuous application of the pressure, both the upper heat regulation plate 15a and the lower heat regulation plate 15b were cooled. The cooling was stopped when both heat regulation plates had reached a temperature of 70° C. The pressure was released when the cooling of the heat regulation plates were completed. The upper heat regulation plate 15a was lifted up to the upper limit, and then, the film peeling apparatus 20A was actuated.

After the film fixation unit 65 on the downstream side in the film transportation direction was released, the auxiliary roll 22 was moved to above the main roll 21 to cause the film 2 to be held on the two rolls through an S-shaped path (the state shown in FIG. 3(c)). While the main roll 21 was kept rotating in the normal direction with a circumferential speed of 20 m/min, the servomotor of the film holding apparatus movement driving means 29 was actuated. As the main roll 21 rotated in the normal direction, the main roll 21 moved toward the upstream side to peel off the film 2 from the mold surface 3a.

After the film 2 located on the mold surface 3a was peeled off entirely from the mold surface 3a, the film fixation unit 54 located on the upstream side was released, and the film holding apparatus 20 that contains the main roll 21 and the auxiliary roll 22 was prevented from moving in the transportation direction of the film 2. Subsequently, the main roll 21 was rotated in the normal direction at a circumferential speed of 20 m/min, and an 850 mm intermittent delivery portion of the film 2 was transported via the main roll 21 and the auxiliary roll 22 into the space above the mold 3. As a result, an intermittent predetermined length delivery portion of the film 2a was supplied to the film production apparatus 1 (the state shown in FIG. 3(f)). At this point, an appropriate degree of tension was applied to the film 2 by the transportation driving roll 64 located on the downstream side so that the film 2 staying in the space above the mold 3 will not slacken and come in contact with the mold surface 3a.

Then, while the main roll 21 is kept rotating in the reverse direction at a circumferential speed of 20 m/min, the servomotor of the film holding apparatus movement driving means 29 was actuated to move the film holding apparatus 20 at the same speed as the circumferential speed. As a result, the film holding apparatus 20, which contain the main roll 21 and the auxiliary roll 22, moved toward the downstream side (the state shown in FIG. 3(g)). This movement caused the film 2 previously delivered into the space above the mold 3 to be supplied to the mold surface 3a, and the main roll 21 moved in coordination with this supply of the film 2 to prevent formation of creases in the film 2 being supplied. During this step, the transportation driving roll 64 located on the downstream side was actuated to apply an appropriate tension to the film 2 to prevent the film 2 from slackening and coming in contact with the mold surface 3a. subsequently, the auxiliary roll revolution driving means 24 was actuated to bring the auxiliary roll 22 back to the stand-by position 22P (the states from FIG. 3(h) to FIG. 3(a)).

The aforementioned process was repeated 10 times to produce 10 pieces of processed film. The intermittent film delivery length is not necessarily the same as the length of the processed portion of the film, leaving unprocessed pattern-free portions between the ends of processed portions, or producing overlaps of patterns between the ends. These portions may be cut out and removed appropriately in manufacturing a final product of a processed film with a desired length.

The patterned surface of the resulting processed film was evaluated based on visual observation, and results showed that the film was completely free of peeling flaws and had an entirely uniform processed surface without creases due to processing, creases due to transportation, or undulation. The time elapsing from the start of peeling of the film (processed film) 2 from the mold surface 3a until the completion of supply of a new portion of the film (processing film) 2 was 20 seconds.

Example 2

The film production apparatus 401 shown in FIG. 4 was used to produce a film having a fine irregular pattern.
(1) The mold 3 used: the same as in Example 1
(2) The film pressing apparatus 10 used: the same as in Example 1
(3) The film holding apparatus 20 used:
A combination of the main roll 21 and the auxiliary roll 22. The main roll 21 has an outside diameter of 150 mm. Its outermost layer is made of silicone rubber having a rubber hardness of 60 (JIS K6253), and the surface has a center line average roughness of 0.5 μm (JIS B0601). The main roll rotation driving means 23 is a servomotor. The auxiliary roll 22 has an outside diameter of 50 mm. Its outermost layer is made of fluorine resin. The distance (clearance H) between the main roll 21 and the mold surface 3a is 10 mm. The film holding apparatus movement driving means 29 for moving to and fro the film holding apparatus 20 including the main roll 21 and the auxiliary roll 22 over the mold surface 3a comprises a servomotor.

(4) The crease formation prevention apparatus 420B used:
The crease-smoothing roll 421 has an outside diameter of 50 mm. Its outermost layer comprises silicone sponge. The distance (clearance H) between the crease-smoothing roll 421 and the mold surface 3a is nearly 0 mm. Thus, the crease-smoothing roll 421 is in contact with the surface of the film 22b.
(5) The film 2 used: the same as in Example 1.
(6) Actuation of major device elements used in the film production apparatus 401:

First, the film 2 was passed through the film transportation path 2A from the film take-out apparatus 50 to the film take-up apparatus 60 via the film pressing apparatus 10. Then, both the upper heat regulation plate 15a and the lower heat regulation plate 15b were heated up to a temperature of 120° C., and the upper heat regulation plate 15a was lowered to start pressing of the film 2. The pressing was implemented with a pressure of 5 MPa at the mold surface 3a and a press time of 30 sec. Subsequently, under continuous application of the pressure, both the upper heat regulation plate 15a and the lower heat regulation plate 15b were cooled. The cooling was stopped when both heat regulation plates had reached a temperature of 70° C. The pressure was released when the cooling of the heat regulation plates were completed. The upper heat regulation plate 15a was lifted up to the upper limit, and then, the film peeling apparatus 20A was actuated.

After the film fixation unit 65 on the downstream side in the film transportation direction was released, the auxiliary roll 22 was moved to above the main roll 21 to cause the film 2 to be held on the two rolls through an S-shaped path (the state shown in FIG. 5(c)). While the main roll 21 was kept rotating in the normal direction with a circumferential speed of 20 m/min, the servomotor of the film holding apparatus movement driving means 29 was actuated. As the main roll 21 rotated in the normal direction, the main roll 21 moved toward the upstream side to peel off the film 2 from the mold surface 3a.

After the film 2 located on the mold surface 3a was peeled off entirely from the mold surface 3a, the film fixation unit 54 located on the upstream side was released, and the film holding apparatus 20 that contains the main roll 21 and the auxiliary roll 22 was prevented from moving in the transportation direction of the film 2. Subsequently, the main roll 21 was rotated in the normal direction at a circumferential speed of 20 m/min, and an 850 mm intermittent delivery portion of the film 2 was transported via the main roll 21 and the auxiliary roll 22 into the space above the mold 3. As a result, an intermittent predetermined length delivery portion of the film 2a was supplied to the film production apparatus 401 (the state shown in FIG. 5(f)). During this step, an appropriate degree of tension was applied to the film 2 by the transportation driving roll 64 located on the downstream side so that the film 2 staying in the space above the mold 3 would not slacken and come in contact with the mold surface 3a.

Then, while the main roll 21 is kept rotating in the reverse direction at a circumferential speed of 20 m/min, the servomotor of the film holding apparatus movement driving means 29 was actuated to move the film holding apparatus 20 at the same speed as the circumferential speed. As a result, the film holding apparatus 20, which contain the main roll 21 and the auxiliary roll 22, moved toward the downstream side (the state shown in FIG. 5(g)). This movement caused the film 2 previously delivered into the space above the mold 3 to be supplied to the mold surface 3a. On the other hand, the crease-smoothing roll 421 moved in coordination with this movement of the film holding apparatus 20 to prevent formation of creases in the film 2 being supplied to the mold surface 3a. During this step, the transportation driving roll 64 located on the downstream side was actuated to apply an appropriate tension to the film 2 to prevent the film 2 from slackening and coming in contact with the mold surface 3a. Subsequently, the auxiliary roll revolution driving means 24 was actuated to bring the auxiliary roll 22 back to the stand-by position 22P (the states from FIG. 5(h) to FIG. 5(a)).

The aforementioned process was repeated 10 times to produce 10 pieces of processed film. The processed surface of the resulting processed film was evaluated based on visual observation, and results showed that the film was completely free of peeling flaws and had an entirely uniform processed surface without creases due to processing, creases due to transportation, or undulation. The time elapsing from the start of peeling of the film (processed film) 2 from the mold surface 3a until the completion of supply of a new portion of the film (processing film) 2 was 20 seconds.

Example 3

The film production apparatus 401 shown in FIG. 4 was used to produce a film having a fine asperity pattern.

(1) The mold 3 used: the same as in Example 1.
(2) The pressing apparatus 10 used: the same as in Example 1.
(3) The film holding apparatus 20 used: the same as in Example 2.
(4) The crease formation prevention apparatus 420B used: the same as in Example 2.
(5) The film 2 used: the same as in Example 1.
(6) Actuation of major device elements used in the film production apparatus 401:

First, the film 2 was passed through the film transportation path 2A from the film take-out apparatus 50 to the film take-up apparatus 60 via the film pressing apparatus 10. Then, both the upper heat regulation plate 15a and the lower heat regulation plate 15b were heated up to a temperature of 120° C., and the upper heat regulation plate 15a was lowered to start pressing of the film 2. The pressing was implemented with a pressure of 5 MPa at the mold surface 3a and a press time of 30 sec. Subsequently, under continuous application of the pressure, both the upper heat regulation plate 15a and the lower heat regulation plate 15b were cooled. The cooling was stopped when both heat regulation plates had reached a temperature of 70° C. The pressure was released when the cooling of the heat regulation plates were completed. The upper heat regulation plate 15a was lifted up to the upper limit, and then, the film peeling apparatus 20A was actuated.

After the film fixation unit 65 on the downstream side in the film transportation direction was released, the auxiliary roll 22 was moved to above the main roll 21 to cause the film 2 to be held on the two rolls through an S-shaped path (the state shown in FIG. 6(c)). While the main roll 21 was kept rotating in the normal direction with a circumferential speed of 20 m/min, the servomotor of the film holding apparatus movement driving means 29 was actuated. As the main roll 21 rotated in the normal direction, the main roll 21 moved toward the upstream side to peel off the film 2 from the mold surface 3a (the states from FIG. 6(d) to FIG. 6(e)).

After the film 2 located on the mold surface 3a was peeled off entirely from the mold surface 3a, the film fixation unit 54 located on the upstream side was released, and the main roll rotation driving means 23 was actuated to prevent the main roll 21 from rotating. In this state, the film holding apparatus movement driving means 29 was actuated to move the film holding apparatus 20 toward the downstream side at a speed of 20 m/min. At the same time, the crease-smoothing roll 421 moved in coordination with the movement of the film holding apparatus 20 to prevent the formation of creases in the film 2 being supplied to the mold surface 3a (the state shown in FIG. 6(f)). During this step, an appropriate degree of tension was applied to the film 2 by the transportation driving roll 64 located on the downstream side so that the film 2 would not slacken and come in contact with the mold surface 3a. Subsequently, the auxiliary roll revolution driving means 24 was actuated to bring the auxiliary roll 22 back to the stand-by position 22P (the states from FIG. 6(g) to FIG. 6(a)).

The aforementioned process was repeated 10 times to produce 10 pieces of processed film. The processed surface of the resulting processed film was evaluated based on visual observation, and results showed that the film was completely free of peeling flaws and had an entirely uniform processed surface without creases due to processing, creases due to transportation, or undulation. The time elapsing from the start of peeling of the film (processed film) 2 from the mold surface 3a until the completion of supply of a new portion of the film (processing film) 2 was 15 seconds.

Example 4

The film production apparatus 701 shown in FIG. 7 was used to produce a film having a fine asperity pattern.

(1) The mold 3 used: the same as in Example 1.
(2) The pressing apparatus 10 used: the same as in Example 1.
(3) The film holding apparatus 20 used:

It comprises a combination of the main roll 21 and the auxiliary roll 22. The main roll 21 has an outside diameter of 150 mm. Its outermost layer is made of silicone rubber having a rubber hardness of 60 (JIS K6253), and the surface has a center line average roughness of 0.5 μm (JIS B0601). The main roll 21 is fixed to a pair of main roll support arms 21Aa and 21Ab in a freely rotatable manner. The auxiliary roll 22 has an outside diameter of 50 mm. Its outermost layer is made of fluorine resin. The auxiliary roll 22 is fixed to a pair of the auxiliary roll revolution support arms 22Aa and 22Ab in a freely rotatable manner. The distance (clearance H) between the main roll 21 and the mold surface 3a is 10 mm. The film holding apparatus movement driving means 29 for moving to and fro the film holding apparatus 20 including the main roll 21 and the auxiliary roll 22 over the mold surface 3a comprises a servomotor.

(4) The crease formation prevention apparatus 420B used:

The crease-smoothing roll 421 has an outside diameter of 50 mm. Its outermost layer comprises silicone sponge. The crease-smoothing roll 421 is fixed to a pair of crease-smoothing roll support arms 22Da and 22Db in a freely rotatable manner. The distance (clearance H) between the crease-smoothing roll 421 and the mold surface 3a is nearly 0 mm. Thus, the crease-smoothing roll 421 is in contact with the surface of the film 22b.

(5) The film tension adjustment means 70 used:

The film tension adjustment means 70 is provided on the film transportation path 2A between the film holding apparatus 20 and the transportation driving roll 64. The transportation driving roll 64 pairs with a nip roll 64a provided on the opposite side of the film 2. In FIG. 7, the film tension adjustment means 70 comprises guide roll 71, the transportation driving roll 64, the tension detection roll 72 that is in contact with the surface of the film 2 traveling from the guide roll 71 to the transportation driving roll 64, and the tension detection means (tension meter) 73 that is combined with the tension detection roll 72. During the peeling of the film 2, the motion of the transportation driving roll 64 is controlled so that the tension detected by the tension meter 73 is maintained constant. To detect the tension applied to the film 2, the tension meter 73 comprises load cells fixed on the bearing supports provided at both ends of the tension detection roll 72 that is supported in a rotatable manner.

(6) The film 2 used: the same as in Example 1.

(7) Actuation of major device elements used in the film production apparatus 701:

First, the film 2 was passed through the film transportation path 2A from the film take-out apparatus 50 to the film take-up apparatus 60 via the film pressing apparatus 10. Then, both the upper heat regulation plate 15a and the lower heat regulation plate 15b were heated up to a temperature of 120° C., and the upper heat regulation plate 15a was lowered to start pressing of the film 2. The pressing was implemented with a pressure of 5 MPa at the mold surface 3a and a press time of 30 sec. Subsequently, under continuous application of the pressure, both the upper heat regulation plate 15a and the lower heat regulation plate 15b were cooled. The cooling was stopped when both heat regulation plates had reached a temperature of 70° C. The pressure was released when the cooling of the heat regulation plates were completed. The upper heat regulation plate 15a was lifted up to the upper limit, and then, the film release apparatus 20A was actuated.

After the film fixation unit 65 on the downstream side in the film transportation direction was released, the auxiliary roll 22 was moved to above the main roll 21 to cause the film 2 to be held on the two rolls through an S-shaped path (the state shown in FIG. 9(c)). The main roll 21, maintained at a circumferential speed of 20 m/min, was moved toward the upstream side to peel off the film 2 from the mold surface 3a.

After the film 2 located on the mold surface 3a was peeled off entirely from the mold surface 3a, the film fixation unit 54 located on the upstream side was released, and the film holding apparatus 20 that contains the main roll 21 and the auxiliary roll 22 was prevented from moving in the transportation direction of the film 2. Subsequently, the transportation driving roll 64 was actuated to a 1,000 mm intermittent delivery length of the film 2 was taken up at a speed of 20 m/min (the state shown in FIG. 9(f)).

Then, the servomotor of the film holding apparatus movement driving means 29 was actuated to move the film holding apparatus 20 toward the downstream side at 20 m/min. At the same time, the crease-smoothing roll 421 moved along the surface of the film 2 being supplied, to prevent the formation of creases in the film 2 being supplied to the mold surface 3a (the state shown in FIG. 9(g)). During this step, the film tension adjustment means 70 was actuated to apply a tension of 9.8N uniformly across the entire width of the film 2. Subsequently, the auxiliary roll revolution driving means 24 was actuated to bring the auxiliary roll 22 back to the stand-by position 22P (the states from FIG. 9(h) to FIG. 9(a)).

The aforementioned process was repeated 10 times to produce 10 pieces of processed film. The processed surface of the resulting processed film was evaluated based on visual observation, and results showed that the film was completely free of peeling flaws and had an entirely uniform processed surface without creases due to processing, creases due to transportation, or undulation. The time elapsing from the start of the mold-release of the film (processed film) 2 from the mold surface 3a until the completion of supply of a new portion of the film (processing film) 2 was 20 seconds.

Comparative Example 1

A film having a fine irregular pattern was produced by using a film production apparatus preparing by removing the film peeling apparatus 20A from the film production apparatus 1 shown in FIG. 1.

(1) The mold 3 used: the same as in Example 1.

(2) The pressing apparatus 10 used: the same as in Example 1.

(3) Method used for peeling of the film 2 from the mold surface 3a:

The transportation driving roll 64 was actuated to deliver the film 2 from the mold surface 3a toward the downstream side to achieve the peeling of the film 2 from the mold surface 3a. In coordination with this delivery of the film, a new portion of the film 2 was supplied to the mold surface 3a. Except for these device elements and production conditions relating to the film peeling process and the new film portion supply process, the other device elements and production conditions were the same as in Example 1.

The peeling of the film 2 from the mold surface 3a and the supply of the film 2 to the mold surface 3a was carried out by means of tension applied by the transportation driving roll 64 to the film 2. This operation was carried out repeatedly 10 times to prepare 10 pieces of processed film.

The patterned surface of the resulting forming film was evaluated based on visual observation, and results showed that two of the ten test pieces suffered film breakage caused during the peeling from the mold surface 3a. Many linear peeling flaws in the width direction of the film were found in the remaining eight pieces. Many creases due to forming, creases due to transportation, and undulations were found in the test pieces free of film breakage. The time elapsing from the start of peeling of the film until the completion of supply of the film was 35 seconds. It was found that film breakage took place frequently during the peeling step if an increased tension was applied to the film to complete the peeling step in less than 35 seconds.

The method and apparatus according to embodiments of the invention for production of a film having a fine asperity pattern on its surface are to be used to produce a film having a fine asperity pattern on its surface to be used as material for optical mediums or optical products.

The invention claimed is:

1. A production method for a film having a fine asperity pattern on a surface thereof, comprising:

(1-a) supplying a processing film composed of a thermoplastic resin as a main component in a film supply step in which said processing film taken out from a long film strip supply source provided on an upstream side is supplied intermittently in the lengthwise direction of the film with a predetermined length onto a mold surface having a fine asperity pattern having a roughness height in the range of 10 nm to 1 mm, (1-b) forming a pattern in a pattern forming step in which said processing film supplied onto said mold surface in said film supply step is pressed against said mold surface so that said pattern on said mold surface is transferred to a surface of said processing film to form a fine asperity pattern on the surface of said processing film, (1-c) peeling the film in a film peeling step in which a processed film having said pattern formed on its surface in said pattern forming step is peeled off from said mold surface, and (1-d) delivering the film in a film delivery step in which said processed film peeled off from said mold surface in said film peeling step is delivered to a long film strip storage source provided on a downstream side, thus processing the film in said pattern forming step to produce said processed film, peeling it off from said mold surface in said film peeling step, and then delivering said processed film to said film storage source in said film delivery step while another predetermined length of said processing film to be processed next is supplied intermittently onto said mold surface, in order to perform repeated production of said processed film with a predetermined length at a time, wherein (1-e) the peeling of said processed film in said film peeling step is achieved by a film holding means that holds said processed film and moves along said mold surface from the downstream side toward the upstream side in the length direction of said processed film, and (1-f) the supply of said processing film in said film supply step is achieved as a crease formation prevention means to prevent creases from forming on said processing film supplied onto said mold surface moves from the upstream side toward the downstream side in the length direction of said processed film.

2. The film production method according to claim 1, wherein (2-a) said film holding means comprises a combination of a main roll that comes in contact with the opposite surface of said film to the surface on which said pattern is formed and an auxiliary roll that comes in contact with the surface of said film on which said pattern is formed, and in said combination, both the roll axis of said main roll and that of said auxiliary roll are arranged respectively in the width direction of said film, said main roll and said auxiliary roll are in parallel to each other with a sufficient gap for said film to pass between them, and both said main roll and said auxiliary roll are respectively rotatable, (2-b) said processed film is suspended on said main roll and said auxiliary roll through an S-shaped path to allow said main roll and said auxiliary roll to hold said processed film, and after achieving such a film-holding state, said film holding means peels off said processed film from said mold surface, (2-c) said main roll and said auxiliary roll rotate while said film holding means stays at a position that it has reached after moving to the upstream side, in order to cause a new predetermined length of the processing film to be supplied to the downstream side via said main roll and said auxiliary roll, and after completion of the supply of said new predetermined length of the processing film, (2-d) said main roll is used as said crease formation prevention means, and (2-e) while said film holding means moves along said mold surface from the upstream side toward the downstream side, said main roll rotates as it moves so that said new predetermined length of the processing film is supplied onto said mold surface while preventing creases from being formed in said processing film.

3. The film production method according to claim 1, wherein (3-a) said film holding means comprises a combination of a main roll that comes in contact with the opposite surface of said film to the surface on which said pattern is formed and an auxiliary roll that comes in contact with the surface of said film on which said pattern is formed, and in said combination, both the roll axis of said main roll and that of said auxiliary roll are arranged respectively in the width direction of said film, said main roll and said auxiliary roll are in parallel to each other with a sufficient gap for said film to pass between them, and both said main roll and said auxiliary roll are respectively rotatable, (3-b) said processed film is suspended on said main roll and said auxiliary roll through an S-shaped path to allow said main roll and said auxiliary roll to hold said processed film, and after achieving such a film-holding state, said film holding means moves along said mold surface from the downstream side toward the upstream side, in order to peel off said processed film from said mold surface, (3-c) said main roll and said auxiliary roll rotate while said film holding means stays at a position that it has reached after moving to the upstream side, in order to cause a new predetermined length of the processing film to be supplied to the downstream side via said main roll and said auxiliary roll, and after completion of the supply of said new predetermined length of the processing film, (3-d) a rotatable crease-smoothing roll that is located on the upstream side of said main roll, with a space from, and in parallel to, said main roll, and in contact with the opposite surface of said film to the surface on which said pattern is formed, is used as said crease formation prevention means, and (3-e) while said film holding means moves along said mold surface from the upstream side toward the downstream side, said crease-smoothing roll moves, while rotating, in coordination with the movement of said film holding means, in order to prevent the formation of creases in said processing film and simultaneously supply said new predetermined length of the processing film onto said mold surface.

4. The film production method according to claim 1, wherein (4-a) said film holding means comprises a combination of a main roll that comes in contact with the opposite surface of said film to the surface on which said pattern is formed and an auxiliary roll that comes in contact with the surface of said film on which said pattern is formed, and in said combination, both the roll axis of said main roll and that of said auxiliary roll are arranged respectively in the width direction of said film, said main roll and said auxiliary roll are in parallel to each other with a sufficient gap for said film to pass between them, and both said main roll and said auxiliary roll are respectively rotatable, (4-b) said processed film is suspended on said main roll and said auxiliary roll through an S-shaped path to allow said main roll and said auxiliary roll to hold said processed film, and after achieving such a film-holding state, said film holding means moves along said mold surface from the downstream side toward the upstream side, in order to peel off said processed film from said mold surface, (4-c) while said main roll is prevented from rotating after said film holding means has moved to the upstream side and comes to a halt, said film holding means moves from the upstream side toward the downstream side to supply a new predetermined length of the processing film, (4-d) a rotatable crease-smoothing roll that is located on the upstream side of said main roll, with a space from, and in parallel to, said main roll, and in contact with the opposite surface of said film to the surface on which said pattern is formed, is used as said crease formation prevention means, and (4-e) while said film holding means moves along said mold surface from the upstream side toward the downstream side during said processing film supply process, said crease-smoothing roll moves, while rotating, in coordination with the movement of said film holding means, in order to prevent the formation of creases in said processing film and simultaneously supply said new predetermined length of the processing film onto said mold surface.

* * * * *